(12) United States Patent
Prakash et al.

(10) Patent No.: US 7,996,636 B1
(45) Date of Patent: Aug. 9, 2011

(54) UNIQUELY IDENTIFYING BLOCK CONTEXT SIGNATURES IN A STORAGE VOLUME HIERARCHY

(75) Inventors: Ashish Prakash, Morrissville, NC (US); Robert M. English, Sunnyvale, CA (US); Eric Hamilton, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 839 days.

(21) Appl. No.: 11/935,704

(22) Filed: Nov. 6, 2007

(51) Int. Cl.
*G06F 13/00* (2006.01)

(52) U.S. Cl. .......................................... 711/162; 711/170

(58) Field of Classification Search .................. 711/162, 711/170
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,570,217 A | 2/1986 | Allen et al. |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,843,541 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,916,608 A | 4/1990 | Shultz |
| 4,989,206 A | 1/1991 | Dunphy, Jr. et al. |
| 5,124,987 A | 6/1992 | Milligan et al. |
| 5,129,088 A | 7/1992 | Auslander et al. |
| RE34,100 E | 10/1992 | Hartness |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,355,453 A | 10/1994 | Row et al. |
| 5,426,747 A | 6/1995 | Weinreb et al. |
| 5,485,579 A | 1/1996 | Hitz et al. |
| 5,511,177 A | 4/1996 | Kagimasa et al. |
| 5,568,629 A | 10/1996 | Gentry et al. |
| 5,581,724 A | 12/1996 | Belsan et al. |
| 5,764,972 A | 6/1998 | Crouse et al. |

(Continued)

FOREIGN PATENT DOCUMENTS

WO    WO 89/10594    11/1989

OTHER PUBLICATIONS

U.S. Appl. No. 10/836,112, entitled Writeable Clone of Read-Only Volume, filed Apr. 30, 2004, by Robert L. Fair et al., 59 pages.

(Continued)

*Primary Examiner* — Reba I. Elmore
(74) *Attorney, Agent, or Firm* — Cesari and McKenna, LLP

(57) ABSTRACT

A technique uniquely identifies block context signatures in a storage volume hierarchy of a storage system. In particular, the technique assigns unique volume identifiers ("IDs," e.g., buffer tree or "bufftree" IDs) to volumes of the storage volume hierarchy, and allows clone volumes to determine that data blocks belong to an appropriate ancestor volume (e.g., and were written by the ancestor volume prior to creation of the clone). In this manner, the novel technique may uniquely identify and accurately determine whether an accessed data block is a correct data block (e.g., alleviating occurrences of data ID aliasing).

21 Claims, 14 Drawing Sheets

U.S. PATENT DOCUMENTS

| | | | |
|---|---|---|---|
| 5,802,366 | A | 9/1998 | Row et al. |
| 5,819,292 | A | 10/1998 | Hitz et al. |
| 5,828,876 | A | 10/1998 | Fish et al. |
| 5,832,513 | A | 11/1998 | Kennedy |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 6,038,570 | A | 3/2000 | Hitz et al. |
| 6,061,770 | A | 5/2000 | Franklin |
| 6,081,875 | A | 6/2000 | Clifton et al. |
| 6,128,627 | A | 10/2000 | Mattis et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,240,527 | B1 | 5/2001 | Schneider et al. |
| 6,341,341 | B1 | 1/2002 | Grummon et al. |
| 6,397,311 | B1 | 5/2002 | Capps et al. |
| 6,457,021 | B1 | 9/2002 | Berkowitz et al. |
| 6,516,380 | B2 | 2/2003 | Kenchammana-Hoskote et al. |
| 6,571,261 | B1 | 5/2003 | Wang-Knop et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,721,764 | B2 | 4/2004 | Hitz et al. |
| 6,732,124 | B1 | 5/2004 | Koseki et al. |
| 6,804,706 | B2 | 10/2004 | Pitts |
| 6,868,417 | B2 | 3/2005 | Kazar et al. |
| 6,978,283 | B1 | 12/2005 | Edwards et al. |
| 7,038,058 | B2 | 5/2006 | Lee et al. |
| 7,107,385 | B2 | 9/2006 | Rajan et al. |
| 7,127,577 | B2 | 10/2006 | Koning et al. |
| 7,194,597 | B2 | 3/2007 | Willis et al. |
| 7,231,412 | B2 | 6/2007 | Hitz et al. |
| 7,334,095 | B1 * | 2/2008 | Fair et al. ................... 711/161 |
| 7,409,494 | B2 | 8/2008 | Edwards et al. |
| 7,590,807 | B2 | 9/2009 | McGovern et al. |
| 2004/0030668 | A1 | 2/2004 | Pawlowski et al. |
| 2005/0246382 | A1 | 11/2005 | Edwards et al. |
| 2005/0246397 | A1 | 11/2005 | Edwards et al. |
| 2006/0184587 | A1 | 8/2006 | Federwisch et al. |
| 2007/0088702 | A1 | 4/2007 | Fridella et al. |

OTHER PUBLICATIONS

Bitton, Dina, Disk Shadowing, Proceedings of the 14.sup.th VLDB Conference, LA, CA (1988), 8 pages.

Chutani, Sailesh, et al., The Episode File System, in Proceedings of the USENIX Winter 1992, 18 pages.

Finlayson, Ross S., et al., Log Files: An Extended File Service Exploiting Write-Once Storage Department of Computer Science, Stanford University, Report No. STAN-CS-87/1177, Sep. 1987, 14 pages.

Gait, Jason, Phoenix: A Safe In-Memory File System. Communications of the ACM, 33(1): pp. 81-86, Jan. 1990.

Hitz, Dave et al., File System Design for an NFS File Server Appliance, Technical Report 3002, Rev. C395, presented Jan. 19, 1994, 23 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kistler, et al., Disconnected Operation in the Coda File System, ACM Transactions on Computer Systems, vol. 10, No. 1, Feb. 1992, pp. 3-25.

Lorie, Raymond, A, Physical Integrity in a large segmented database, ACM Trans. Database Systems, 2(1): 91-104, Mar. 1977.

Lorie, RA, Shadow Page Mechanism, IBM Technical Disclosure Bulletin, Jun. 1986, pp. 340-342.

McKusick, Marshall Kirk, et al., A Fast File System for UNIX, Computer Science Division, Department of Electrical Engineering and Computer Sciences, Univ. of CA, Berkley, Feb. 18, 1994, 14 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Ousterhout, John, Why Aren't Operating Systems Getting Faster as Fast as Hardware?, Digital WRL Technical Note TN-11, Oct. 1989, 20 pages.

Ousterhout, John, A Brief Retrospective on the Sprite Network Operating System, found at http://www.cs.berkeley.edu/projects/sprite/retrospective.html.visited on Mar. 11, 2005, 5 pages.

Patterson, D., et al., A Case for Redundant Arrays of Inexpensive Disks (RAID), Technical Report, CSD-87-391, Computer Science Division, Electrical Engineering and Computer Sciences, University of California at Berkeley (1987), 26 pages.

Patterson, D., et al., A Case for Redundant Arrays of Inexpensive Disks (RAID), SIGMOD International Conference on Management of Data, Chicago, IL, USA, Jun. 1-3, 1988, SIGMOD Record (17):3:109-16 (Sep. 1988).

Peterson, Zachary Nathaniel Joseph, Data Placement for Copy-on-Write Using Virtual Contiguity, University of CA, Santa Cruz, Master of Science in Computer Science Thesis, Sep. 2002.

Quinlan, Sean, A Cached WORM File System, Software-Practice and Experience, 21(12):1289-1299 (1991).

Rosenberg, J., et al., Stability in a Persistant Store Based on a Large Virtual Memory, In Security and Persistence, Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Sidebotham, Bob, Volumes: The Andrew File System Data Structuring Primitive, EEUG Conference Proceedings, Manchester, UK, Autumn 1986.

West, Michael, et al. The ITC Distributed File System: Prototype and Experience, Carnegie-Mellon University, Technical Report CMU-ITC-040, Mar. 1985, 17 pages.

Zayas, Edward R., AFS-3 Programmer's Reference: Architectural Overview, Transarc Corporation, Pittsburgh, PA, 1.0 edition 1991, 37 pages.

* cited by examiner

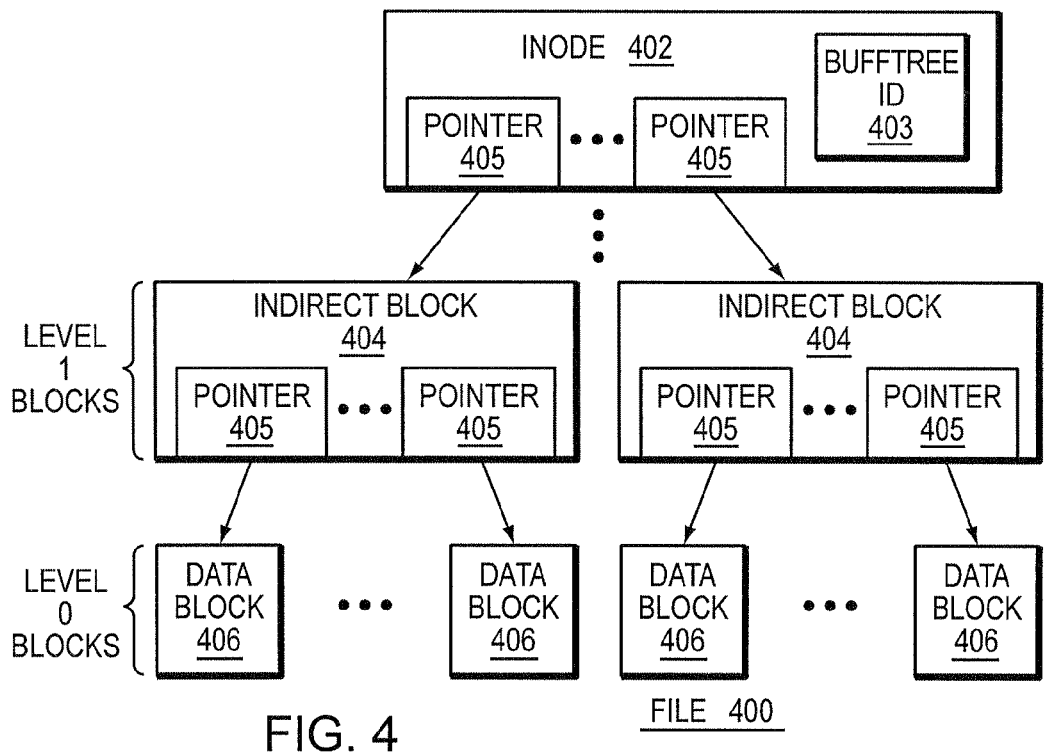
FIG. 4  FILE 400
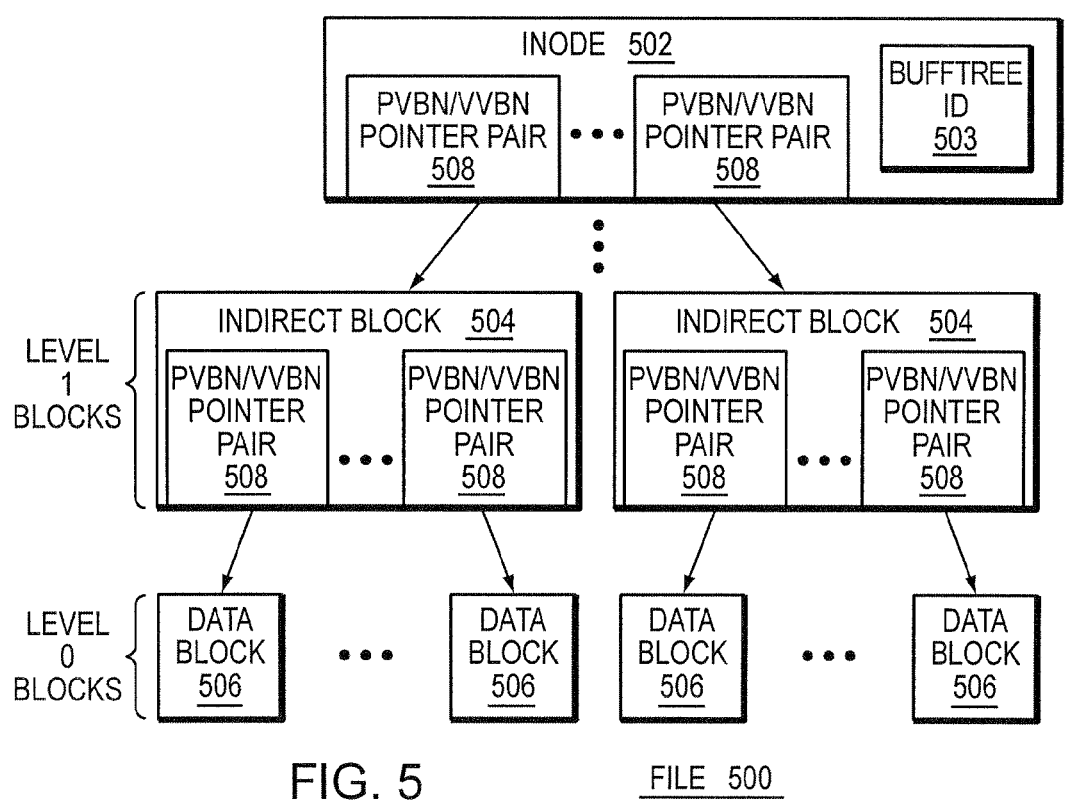
FIG. 5  FILE 500

UNIQUELY IDENTIFYING BLOCK CONTEXT SIGNATURES IN A STORAGE VOLUME HIERARCHY

FIELD OF THE INVENTION

The present invention relates to storage systems and, in particular, to uniquely identifying block context signatures in a storage volume hierarchy.

BACKGROUND OF THE INVENTION

A storage system is a computer that provides storage service relating to the organization of information on writable persistent storage devices, such as memories, tapes, or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks (or "data blocks"), configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object, or any other storage entity that does not correspond directly to a set of fixed data storage de-vices. A file system is, generally, a computer system for managing such files, including the allocation of fixed storage space to store files on a temporary or permanent basis.

As will be understood by those skilled in the art, many storage systems store a checksum value with each data block, e.g., a count of the number of set bits in the data block. In this manner, when reading the data block, the checksum may be confirmed to ensure that the data block was read correctly, such as where a newly computed checksum based on the read data matches the stored checksum. In addition, certain storage systems are configured to store context information (or "context signatures") along with the checksum. For instance, certain storage file systems, such as a Write Anywhere File Layout (WAFL®) file system (available from Network Appliance, Inc., of Sunnyvale, Calif.), may implement various techniques to point to physical storage locations for data block access. As such, while the checksum may be used to confirm that the data within a stored data block was read correctly, the context information may be used to confirm that the data block accessed is the correct data block.

For example, context information may comprise a buffer tree identifier ("bufftree ID") of a volume (or other storage grouping representation, as described herein or as will be understood by those skilled in the art) that wrote/stored the data block, a data ID of the data block (e.g., a pointer to the data block as used by the volume), and a write time (e.g., a "generation count") indicating when the data block was written. For instance, when reading a block of data, a volume may confirm that the bufftree ID and the data ID of the data block context signature match the expected bufftree ID and data ID. (Currently, the write time is generally only used to confirm valid data, i.e., that the data was not written in the future.) If the context signature does not match, however, then the storage system may determine that the data block has either been incorrectly written (e.g., a "lost write") or that the data block has been moved ("reallocated") to a new physical location (e.g., to defragment free space by cleaning segments, etc., as will be understood by those skilled in the art). Accordingly, then, the storage system may attempt to recover the data block, that is, attempt to locate the physical storage location for the re-allocated data block, or re-construct data from parity in the case of a "lost write".

Occasionally, a copy or "clone" of a storage volume (i.e., of a "parent" volume) may be created, such as for backup purposes, for writeable copies, etc. Clones, generally, may be initially established by sharing the underlying data blocks (and physical storage) of the parent volume, and as each of the volumes are modified, the shared data blocks may begin to diverge into data that specifically belongs to one or the other volume. An example technique that may be used to copy/clone a volume is described in commonly owned, U.S. patent application Ser. No. 10/837,254, entitled CLONING TECHNIQUE FOR EFFICIENTLY CREATING A COPY OF A VOLUME IN A STORAGE SYSTEM, filed Apr. 30, 2004 by John K. Edwards et al., now issued as U.S. Pat. No. 7,409,511 on Aug. 5, 2008, and in commonly owned, U.S. patent application Ser. No. 10/836,112, entitled WRITEABLE CLONE OF READ-ONLY VOLUME, filed Apr. 30, 2004 by Robert L. Fair et al., now issued as U.S. Pat. No. 7,334,095 on Feb. 19, 2008, the contents of both of which are hereby incorporated by reference in their entirety. Currently, clones typically inherit the bufftree ID of their parent volumes in order to be able to read data blocks that are shared with their parents without triggering a context mismatch. In particular, when reading a data block shared with a parent volume, the clone volume still confirms that the bufftree ID and the data ID of the data block context signature match the expected bufftree ID and data ID, i.e., thus the bufftree ID currently must match both the parent and the clone's bufftree ID, otherwise creating a context mismatch. (For example, this may be necessary to avoid false positives while reading shared blocks between clones and parents.)

In many situations, using the parent volume's bufftree ID as the clone volume's bufftree ID is a viable solution. However, by having multiple volumes share a bufftree ID, in particular, multiple volumes that are independently able to move, delete, and create data blocks with corresponding data IDs, the potential for overlapping data block context signatures exist (i.e., contexts with the same bufftree ID and data ID, but with different data). Specifically, this potential for overlapping may result in data ID "aliasing", which may result in incorrectly returned (and confirmed) data. As such, where data ID aliasing has occurred, it may be impossible to detect incorrect data blocks (e.g., for lost write detection) and to correct an incorrect data block, e.g., using a reconstruction mechanism from parity; and to correctly locate blocks in the case of re-allocation.

There remains a need, therefore, for a technique that uniquely identifies block ownership among related storage volumes (e.g., among parents and clones of a storage volume hierarchy, etc.).

SUMMARY OF THE INVENTION

The disadvantages of the prior art are overcome by providing a system and method for uniquely identifying block context signatures in a storage volume hierarchy of a storage system. In particular, a novel technique is provided that allows for fine-grained context checking, particularly for clone volumes and their ancestors (e.g., parent volumes) and sibling volumes (e.g., clones of a same parent volume). By assigning unique identifiers ("IDs," e.g., buffer tree or "bufftree IDs") to volumes of the storage volume hierarchy, yet allowing clone volumes to determine that data blocks belong to an appropriate ancestor volume (e.g., and were written by the ancestor volume prior to creation of the clone), the novel technique may uniquely identify and accurately determine whether an accessed data block is a correct data block (e.g., alleviating occurrences of data ID aliasing).

Illustratively, in accordance with one or more embodiments of the present invention, the novel technique accesses a data block at a physical storage location for a volume having a unique bufftree ID (e.g., a clone volume). If a data ID of the accessed data block confirms with an expected data ID, and if a bufftree ID matches the unique bufftree ID of the volume, then the data is determined to be correct data. If the data ID is expected, but the bufftree ID of the accessed data block does not match the unique bufftree ID of the volume, then the bufftree ID of the accessed data block may be compared against any ancestor bufftree IDs (e.g., parent volumes, parents of parent volumes, etc.) of the volume accessing the data block. If the bufftree ID of the accessed data block confirms with a bufftree ID of an ancestor volume, the data block may be determined to be a correct data block. If at least one of either the data ID or the bufftree ID of the data block are unconfirmed, however, then the data block is an incorrect data block (e.g., which the volume may attempt to locate at a new physical storage location).

Also, in accordance with one or more embodiments of the present invention, the data block may have an associated write time corresponding to a time at which the data was stored, and the volume accessing the data block may also have an associated write time corresponding to a time at which the volume was created (e.g., particularly for a clone volume). In this manner, if the bufftree ID of the accessed data block confirms with a bufftree ID of an ancestor volume, the write times may be used to determine whether the write time of the data block is prior to creation of the volume for which the data block is accessed. Specifically, if the data block was written before creation of the clone volume, the clone volume shares the previously written data block, and the data block is a correct data block. If, however, the data block was written after creation of the clone volume, the data block has since been rewritten by an ancestor volume, and is an incorrect data block. In summary, a block has a correct context signature for reads of shared blocks by clone volumes if the bufftree ID in the context signature matches a buff-tree ID in the clone ancestry and the write time in the context signature is older than the creation time of the clone.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 4 is a schematic block diagram of an exemplary buffer tree in accordance with an embodiment of the invention;

FIG. 5 is a schematic block diagram of an exemplary buffer tree in accordance with an embodiment of the present invention;

DETAILED DESCRIPTION OF ILLUSTRATIVE EMBODIMENTS

The present invention is directed to a system and method for uniquely identifying block context signatures in a storage volume hierarchy of a storage system. In particular, one or more novel techniques assign unique buffer tree identifiers ("bufftree IDs") to par-ent and clone volumes of the storage volume hierarchy, and allow the storage system to determine whether an accessed data block of the volume hierarchy is a correct data block. Accordingly, the techniques alleviate occurrences of data ID aliasing by preventing over-lapping signatures (e.g., shared bufftree IDs and data IDs) and context mismatches, as would be the case with sharing bufftree IDs between volumes of the hierarchy (e.g., between parent and clone volumes).

A. Storage System

The present invention may be implemented, in the illustrative embodiment, on a storage appliance that serves both file and block protocol access to information stored on storage devices in an integrated manner. In this context, the term storage appliance de-notes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (LUN) emulation.

Figure 1:
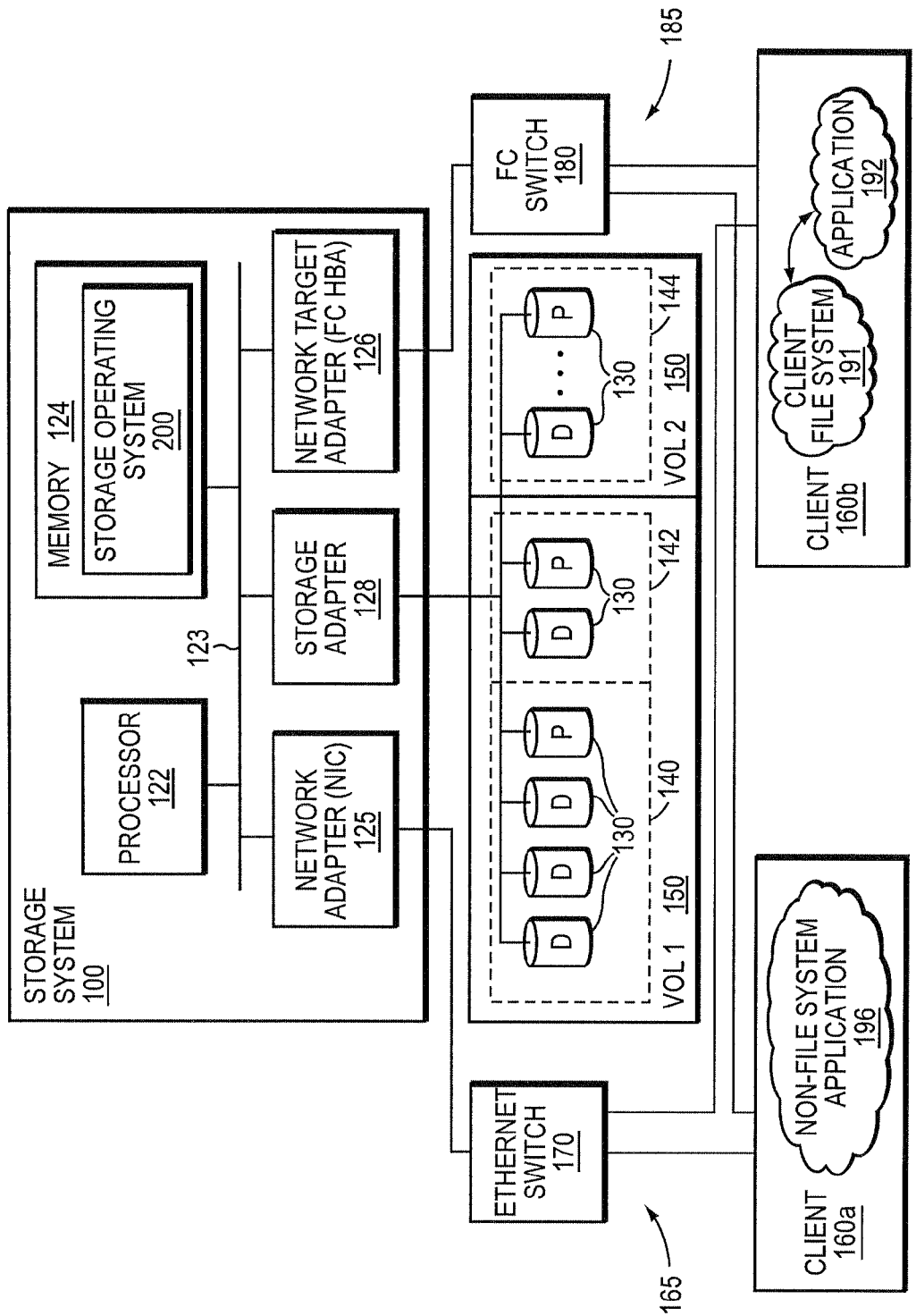
FIG. 1 is a schematic block diagram of an exemplary storage system in accordance with an embodiment of the present invention.

FIG. 1 is a schematic block diagram of a storage appliance configured to provide storage service relating to the organization of information on storage devices, such as disks 130. The storage appliance is illustratively embodied as a storage system 100 comprising a processor 122, a memory 124, a plurality of network adapters 125, 126, and a storage adapter 128 interconnected by a system bus 123. The storage system 100 also includes a storage operating system 200 that provides a virtualization system (and, in particular, a file system) to logically organize the information as a hierarchical structure of named directory, file, and virtual disk (vdisk) storage objects on the disks 130.

Whereas clients of a NAS-based network environment have a storage viewpoint of files, the clients of a SAN-based network environment have a storage viewpoint of blocks or disks. To that end, the storage system 100 presents (exports) disks to SAN clients through the creation of logical unit numbers (LUNs) or vdisk objects. A vdisk object (hereinafter "vdisk") is a special file type that is implemented by the virtualization system and translated into an emulated disk as viewed by the SAN clients. The storage system thereafter makes these vdisks accessible to the SAN clients on LUNs through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage system by, inter alia, invoking storage operations in sup-port of the storage service implemented by the system. It will be apparent to those skilled in the art that other processing and memory means, including various computer readable media, may be used for storing and executing program instructions pertaining to the inventive system and method described herein.

The network adapter 125 couples the storage system to a plurality of clients 160*a,b* over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the storage system to a network switch, such as a conventional Ethernet switch 170. For this NAS-based network environment, the clients are configured to access information stored on the storage system as files. The clients 160 communicate with the storage system over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based net-work. Therefore, each client 160 may request the services of the storage system 100 by issuing file access protocol messages (in the form of packets) to the appliance over the network 165. It will be apparent to those skilled in the art that other clients running other types of operating systems may also communicate with the storage system using other file access protocols.

Illustratively, client (or host) 160*b* includes a client file system 191 that interfaces with one or more applications 192. The client file system 191 is illustratively overlaid onto a data container (such as a LUN) served by the storage system. For example, the storage system may export the LUN, which the client file system 191 utilizes to store data. Alternately, a non-file system application 196 executing on client 160*a* may comprise a database system or other system.

The storage network "target" adapter 126 also couples the multi-protocol storage system 100 to clients 160 that may be further configured to access the stored information as blocks or disks. For this SAN-based network environment, the storage system is coupled to an illustrative Fibre Channel (FC) network 185. FC is a networking standard de-scribing a suite of protocols and media that is primarily found in SAN deployments. The network target adapter 126 may comprise a FC host bus adapter (HBA) having the mechanical, electrical and signaling circuitry needed to connect the storage system 100 to a SAN network switch, such as a conventional FC switch 180. In addition to providing FC access, the FC HBA may offload Fibre Channel network processing operations for the storage system.

The clients 160 generally utilize block-based access protocols, such as the Small Computer Systems Interface (SCSI) protocol, when accessing information (in the form of blocks, disks or LUNs) over a SAN-based network. SCSI is a peripheral input/output (I/O) interface with a standard, device independent protocol that allows different peripheral devices, such as disks 130, to attach to the storage system 100. In SCSI terminology, clients 160 operating in a SAN environment are initiators that initiate requests and commands for data. The storage system is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage system 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage system 100) by issuing iSCSI and FCP messages over the net-work 165, 185 to access information stored on the disks. It will be apparent to those skilled in the art that the clients may also request the services of the storage system using other block access protocols. By supporting a plurality of block access protocols, the storage system provides a unified and coherent access solution to vdisks/LUNs in a heterogeneous SAN environment.

The storage adapter 128 cooperates with the storage operating system 200 executing on the storage system to access information requested by the clients. The information may be stored on the disks 130 or other similar media adapted to store information. The storage adapter includes I/O interface circuitry that couples to the disks over an I/O inter-connect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the system 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Illustratively, each volume 150 may be constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed.

B. Storage Operating System

To facilitate access to the disks 130, the storage operating system 200 may implement a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage system via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow vdisks/LUNs and exports to persist over, e.g., reboot operations, while also enabling management of the vdisk/LUN as a single disk object in relation to SAN clients. An example of a vdisk and its associated inodes that may be advantageously used with the present invention is described in U.S. Pat. No. 7,107,385, entitled STORAGE VIRTUALIZATION BY LAYERING VIRTUAL DISK OBJECTS ON A FILE SYSTEM, by Vijayan Rajan, et al. issued on Sep. 12, 2006, by which application is hereby incorporated by reference as though fully set forth herein.

In the illustrative embodiment, the storage operating system is preferably the NetApp® Data ONTAP® operating system available from Network Appliance, Inc., of Sunnyvale, Calif. that implements a Write Anywhere File Layout (WAFL®) file sys-tem. However, it is expressly contemplated that any appropriate storage operating sys-tem, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage system, implement data access semantics, such as the Data ONTAP storage operating system, which is implemented as a microkernel. The storage operating system can also be implemented as an application program operating over a general-purpose operating system, such as UNIX®, or Windows NT® or XP®, or as a general-purpose operating system with configurable functionality, which is configured for storage applications as described herein.

In addition, it will be understood to those skilled in the art that the inventive sys-tem and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage (NAS) environment, a storage area network (SAN), and a disk assembly directly-attached to a client or host computer. The term "storage system" should therefore be taken broadly to include such arrangements in addition to any subsystems configured to perform a storage function and associated with other equipment or systems.

Figure 2:
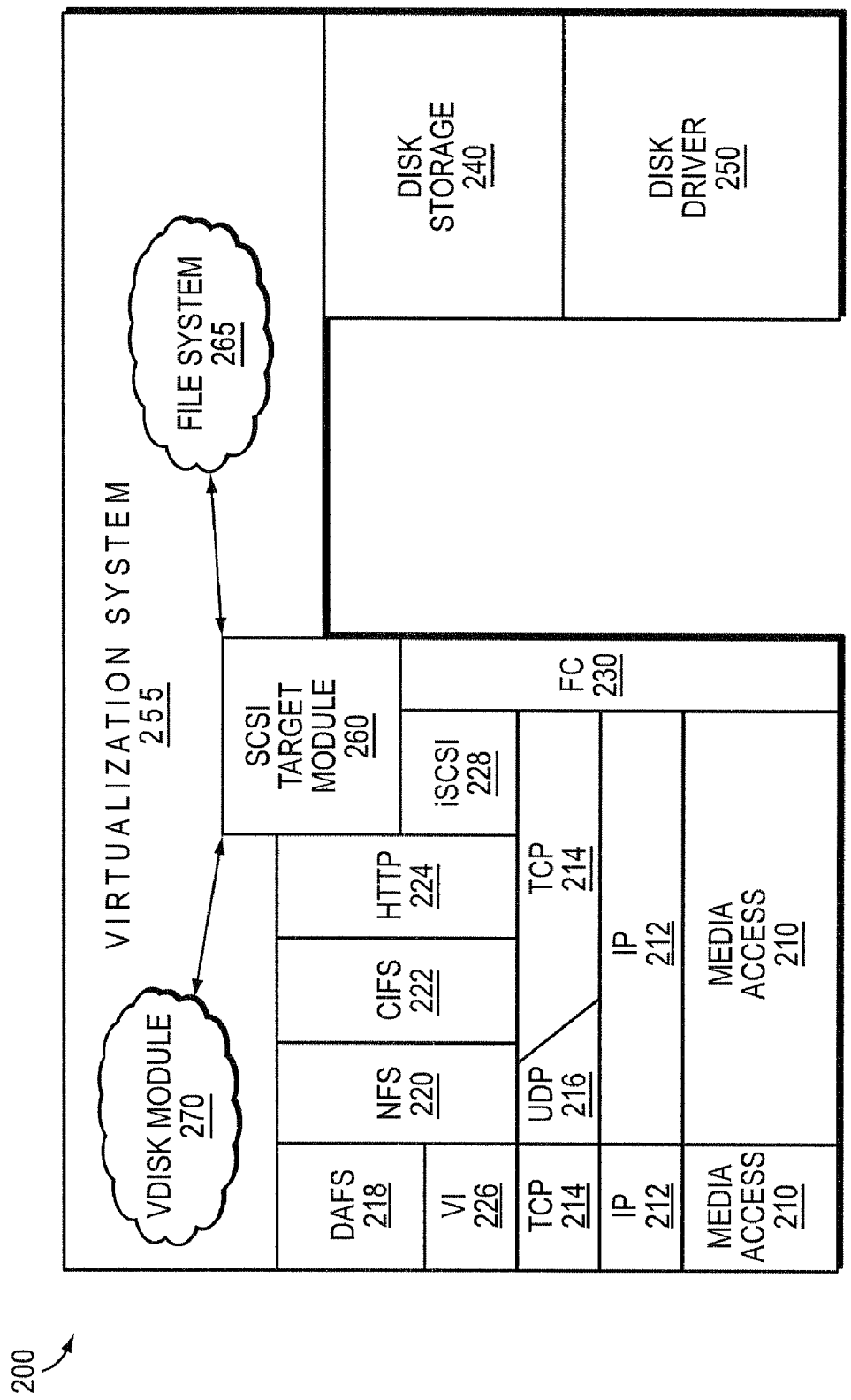
FIG. 2 is a schematic block diagram of an exemplary storage operating system for use with the storage system of FIG. 1 in accordance with an embodiment of the present invention.

FIG. 2 is a schematic block diagram of an exemplary storage operating system 200 that may be advantageously used with the present invention. The storage operating sys-tem comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A Virtual Inter-face (VI) layer 226 implements the VI architecture to provide direct access transport (DAT) capabilities, such as RDMA, as required by the DAFS protocol 218.

An iSCSI driver layer 228 provides block protocol access over the TCP/IP net-work protocol layers, while a FC driver layer 230 operates with the FC HBA 126 to receive and transmit block access requests and responses to and from the storage system. The FC and iSCSI drivers provide FC-specific and iSCSI-specific access control to the LUNs (vdisks) and, thus, manage exports of vdisks to either iSCSI or FCP or, alternatively, to both iSCSI and FCP when accessing a single vdisk on the storage system. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack lay-ers is a virtualization system 255 that is implemented by a file system 265 cooperating with virtualization modules illustratively embodied as, e.g., vdisk module 270 and SCSI target module 260. It should be noted that the vdisk module 270, file system 265, and SCSI target module 260 can be implemented in software, hardware, firmware, or a combination thereof. The vdisk module 270 is layered on (and interacts with) the file system 265 to provide a data path from the block-based SCSI target module to blocks managed by the file system. In essence, the vdisk module 270 manages SAN deployments by, among other things, implementing a comprehensive set of vdisk (LUN) commands issued through a user interface by a system administrator. These vdisk commands are converted to primitive file system operations ("primitives") that interact with the file system 265 and the SCSI target module 260 to implement the vdisks. (In other words, the vdisk module provides an administrative interface for LUNs, while the SCSI target module implements the SCSI protocol.)

The SCSI target module 260, in turn, initiates emulation of a disk or LUN by pro-viding a mapping procedure that translates logical block access to LUNs specified in access requests into virtual block access to the special vdisk file types and, for responses to the requests, vdisks into LUNs. The SCSI target module is illustratively disposed between the FC and iSCSI drivers 230, 228 and the file system 265 to thereby provide a translation layer of the virtualization system 255 between the SAN block (LUN) space and the file system space, where LUNs are represented as vdisks.

The file system 265 illustratively implements the above-described WAFL file sys-tem having an on-disk format representation that is block-based using, e.g., 4 kilobyte (kB) blocks and using inodes to describe the files. Broadly stated, all inodes of the file system are organized into the inode file. A file system (fs) info block specifies the layout of information in the file system and includes an inode of a file that includes all other inodes of the file system. Each volume has an fsinfo block (e.g., pointed to by a volinfo block, described herein) that is preferably stored at a fixed location within, e.g., a RAID group of the file system. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the storage system may alternatively be implemented in hardware. That is, in an alternate embodiment of the invention, a storage access request data path through the operating system layers (including the virtualization system 255) may be implemented as logic circuitry embodied within a field programmable gate array (FPGA) or an application specific integrated circuit (ASIC). This type of hardware implementation increases the performance of the storage service provided by system 100 in response to a file access or block access request issued by a client 160. Moreover, in another alternate embodiment of the invention, the processing elements of network and storage adapters 125-128 may be configured to offload some or all of the packet processing and storage access operations, respectively, from processor 122 to thereby increase the performance of the storage service provided by the multi-protocol storage system. It is expressly contemplated that the various processes, architectures, and procedures described herein can be implemented in hardware, firmware, or software.

C. File System Organization

Figure 3:
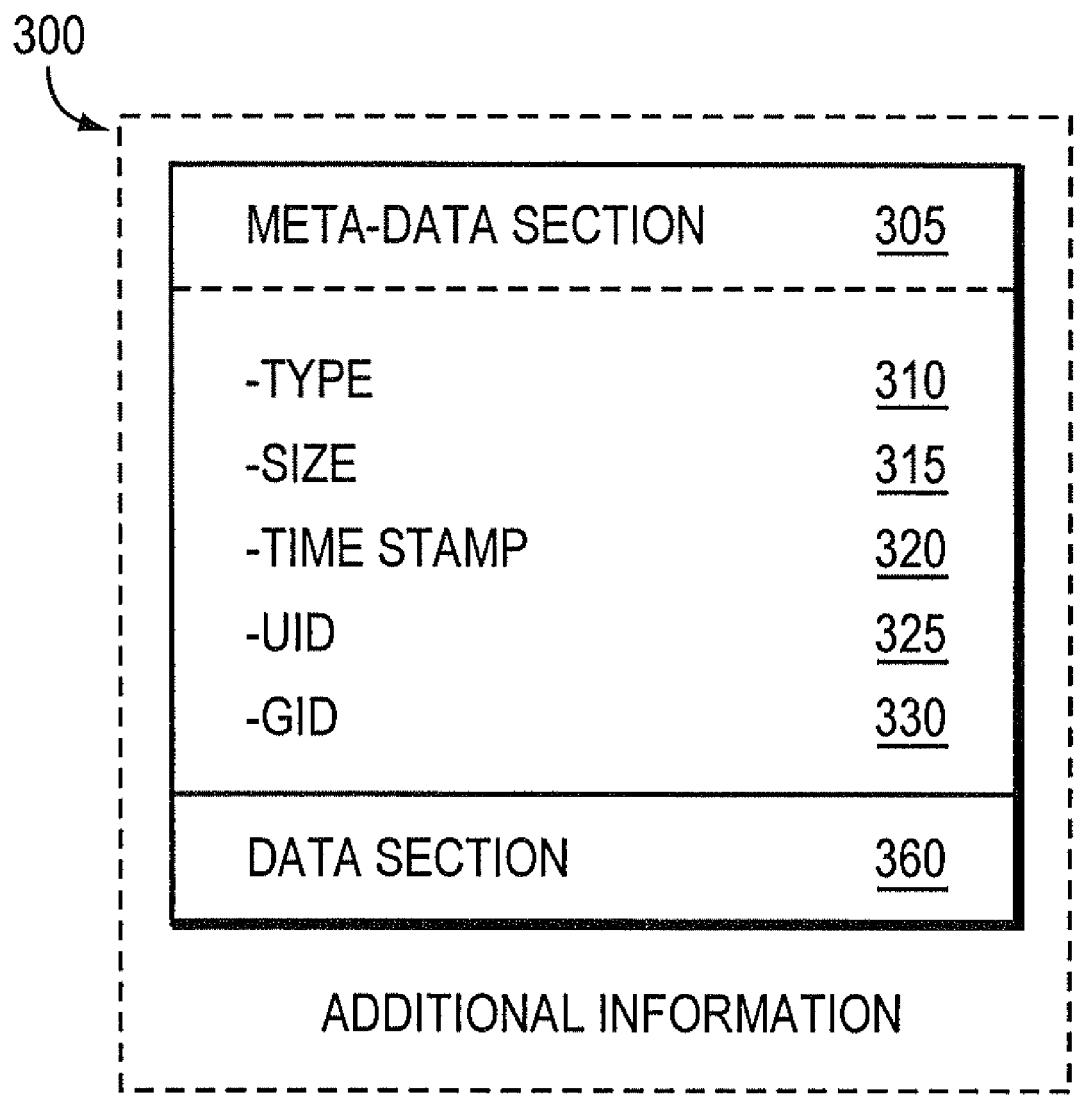
FIG. 3 is a schematic block diagram of an exemplary inode in accordance with an embodiment of the present invention.

In the illustrative embodiment, a data container is represented in the write-anywhere file system as an inode data structure adapted for storage on the disks 130. FIG. 3 is a schematic block diagram of an inode 300, which preferably includes a meta-data section 305 and a data section 360. The information stored in the meta-data section 305 of each inode 300 describes the data container (e.g., a file) and, as such, includes the type (e.g., regular, directory, vdisk) 310 of file, its size 315, time stamps (e.g., access and/or modification time) 320 and ownership, i.e., user identifier (UID 325) and group ID (GID 330), of the file. The contents of the data section 360 of each inode may be interpreted differently depending upon the type of file (inode) defined within the type field 310. For example, the data section 360 of a directory inode contains meta-data controlled by the file system, whereas the data section of a regular inode contains file system data. In this latter case, the data section 360 includes a representation of the data associated with the file.

Illustratively, the data section 360 of a regular on-disk inode may include file sys-tem data or pointers, the latter referencing 4 KB data blocks on disk used to store the file system data. Each pointer is preferably a logical vbn (virtual block number) to facilitate efficiency among the file system and the RAID system (disk storage 240) when accessing the data on disks. Given a restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 360 of the inode (e.g., a second level inode) references an indirect block (e.g., a first level L1 block) that contains 1024 pointers, each of which references a 4 KB data block on disk. For file system data having a size greater than 64 MB, each pointer in the data section 360 of the inode (e.g., a third level L3 inode) references a double-indirect block (e.g., a second level L2 block) that contains 1024 pointers, each referencing an indirect (e.g., a first level L1) block. The indirect block, in turn, that contains 1024 pointers, each of which references a 4 KB data block on disk. When accessing a file, each block of the file may be loaded from disk 130 into the memory 124.

When an on-disk inode (or block) is loaded from disk 130 into memory 124, its corresponding in-core structure embeds the on-disk structure. For example, the dotted line surrounding the inode 300 indicates the in-core representation of the on-disk inode structure. The in-core structure is a block of memory that stores the on-disk structure plus additional information needed to manage data in the memory (but not on disk). The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

FIG. 4 is a schematic block diagram of an embodiment of a buffer tree of a file that may be advantageously used with the present invention. The buffer tree is an internal representation of blocks for a file (e.g., file 400) loaded into the memory 124 and maintained by the write-anywhere file system 265. Notably, each buffer tree has an identifier (a "bufftree ID" as used herein). A root (top-level) inode 402, such as an embedded inode, references indirect (e.g., level 1) blocks 404, and may comprise a bufftree ID 403 (described further herein). Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as storage system 100. An example of such a file system layout is described in commonly-owned, U.S. patent application Ser. No. 10/836,090, entitled EXTENSION OF WRITE ANYWHERE FILE LAYOUT WRITE ALLOCATION, filed on Apr. 30, 2004 by John K. Edwards, now issued as U.S. Pat. No. 7,430,571 on Aug. 5, 2008, the contents of which are hereby incorporated by reference in its entirety. The underlying physical volume is an aggregate comprising one or more groups of disks, such as RAID groups, of the system. The aggregate has its own physical volume block number (pvbn) space (e.g., physical storage locations) and maintains meta-data, such as block allocation structures, within that pvbn space. Each flexible volume has its own virtual volume block number (vvbn) space (data identifiers, IDs) and maintains meta-data, such as block allocation structures, within that vvbn space. Each flexible volume is a file system that is associated with a container file; the container file (described further below) is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 400) stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk, dbn (disk block number) occurs at the file system/RAID system boundary of the storage operating system 200.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, Mode file level 0 (L0) blocks. FIG. 5 is a schematic block diagram of an illustrative embodiment of a buffer tree of a file 500 that may be advantageously used with the present invention. A root (top-level) Mode 502, such as an embedded Mode, references indirect (e.g., level 1) blocks 504, and may comprise a bufftree ID 503 (described further herein). Note that there may be additional levels of indirect blocks (e.g., level 2, level 3) depending upon the size of the file. The indirect blocks (and Mode) contain pvbn/vvbn pointer pair structures 508 that ultimately reference data blocks 506 used to store the actual data of the file.

The pvbns reference locations on disks of the aggregate, whereas the vvbns reference locations within files of the flexible volume. The use of pvbns as block pointers 508 in the indirect blocks 504 provides efficiencies in the read paths, while the use of vvbn block pointers provides efficient access to required meta-data. That is, when accessing a block of a file, the parent indirect block in the file contains readily available vvbn block pointers, which avoids the latency associated with accessing an owner map to perform pvbn-to-vvbn translations; yet, on the read path, the pvbn is available.

Figure 6:
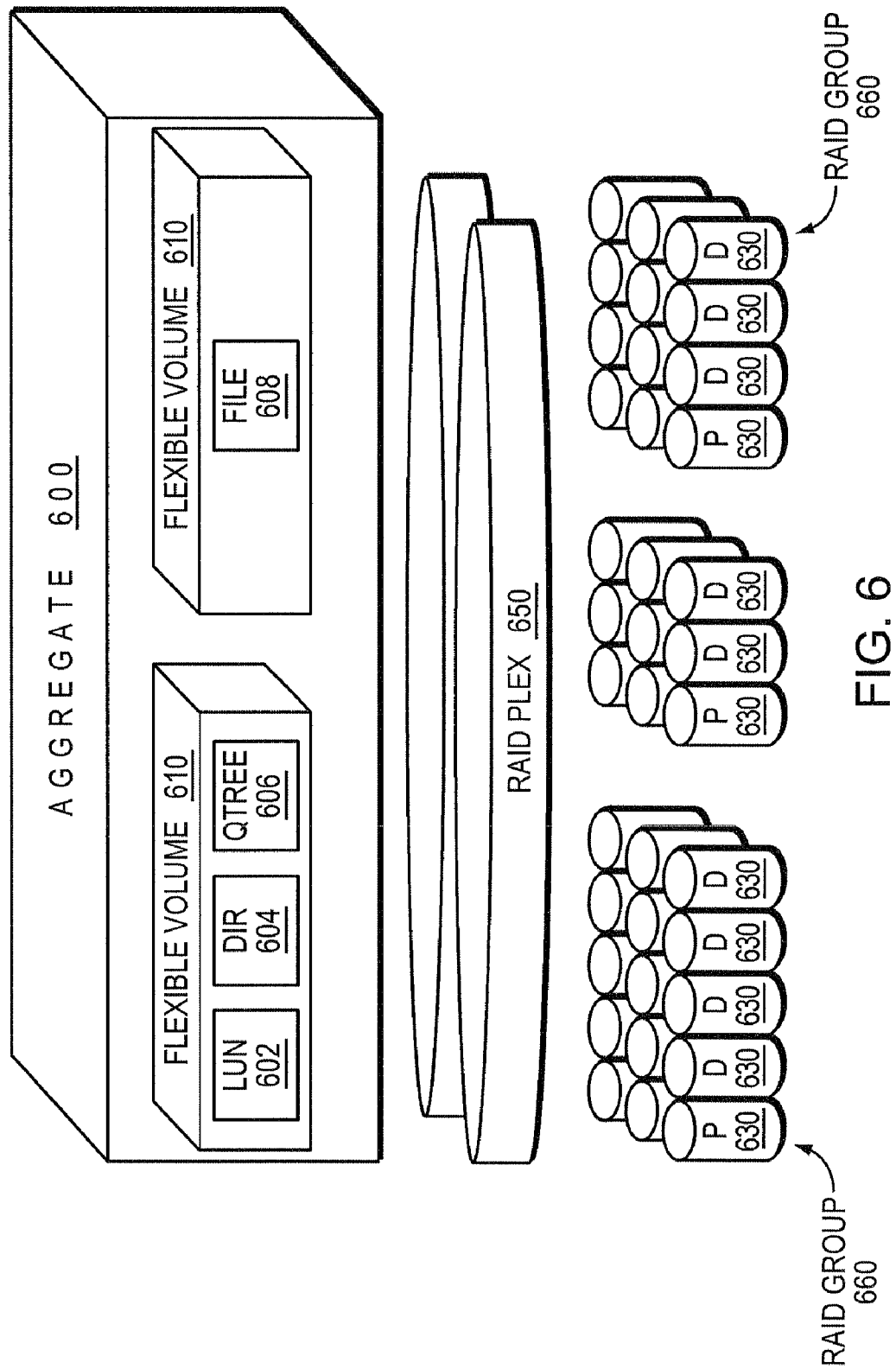
FIG. 6 is a schematic block diagram of an exemplary aggregate in accordance with an embodiment of the present invention.

FIG. 6 is a schematic block diagram of an embodiment of an aggregate 600 that may be advantageously used with the present invention. LUNs (blocks) 602, directories 604, qtrees 606, and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks 630, e.g., one or more data (D) disks and at least one (P) parity disk.

Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume. The aggregate utilizes a physical pvbn space that defines a storage space of blocks (physical storage locations for data blocks, as used herein) provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 610 is also a logical volume, it has its own block allocation structures (e.g., active, space, and summary maps) in its vvbn space.

A container file is a file in the aggregate that contains all blocks used by a flexible volume. The container file is an internal (to the aggregate) feature that supports a flexible volume (illustratively, there is one container file per flexible volume), and contains a mapping of vvbns of the corresponding flexible volume to pvbns of the aggregate (vvbn-to-pvbn mapping). For example, the container file may comprise an index (e.g., list) of vvbn-to-pvbn mappings for the flexible volume, which may generally correlate to the level 1 indirect blocks of the flexible volume organized as a container map with vvbn/pvbn mappings/pairs (e.g., the level 1 block of a container file at the given index value (between 0 and 1023) depending on the vvbn gives the corresponding pvbn). Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a RAID label and, as such, contains information about the state of the flexible volume such as, e.g., the name of the flexible volume, a universal unique identifier (uuid) and fsid of the flexible volume, whether it is online, being created, or being destroyed, etc.

Figure 7:
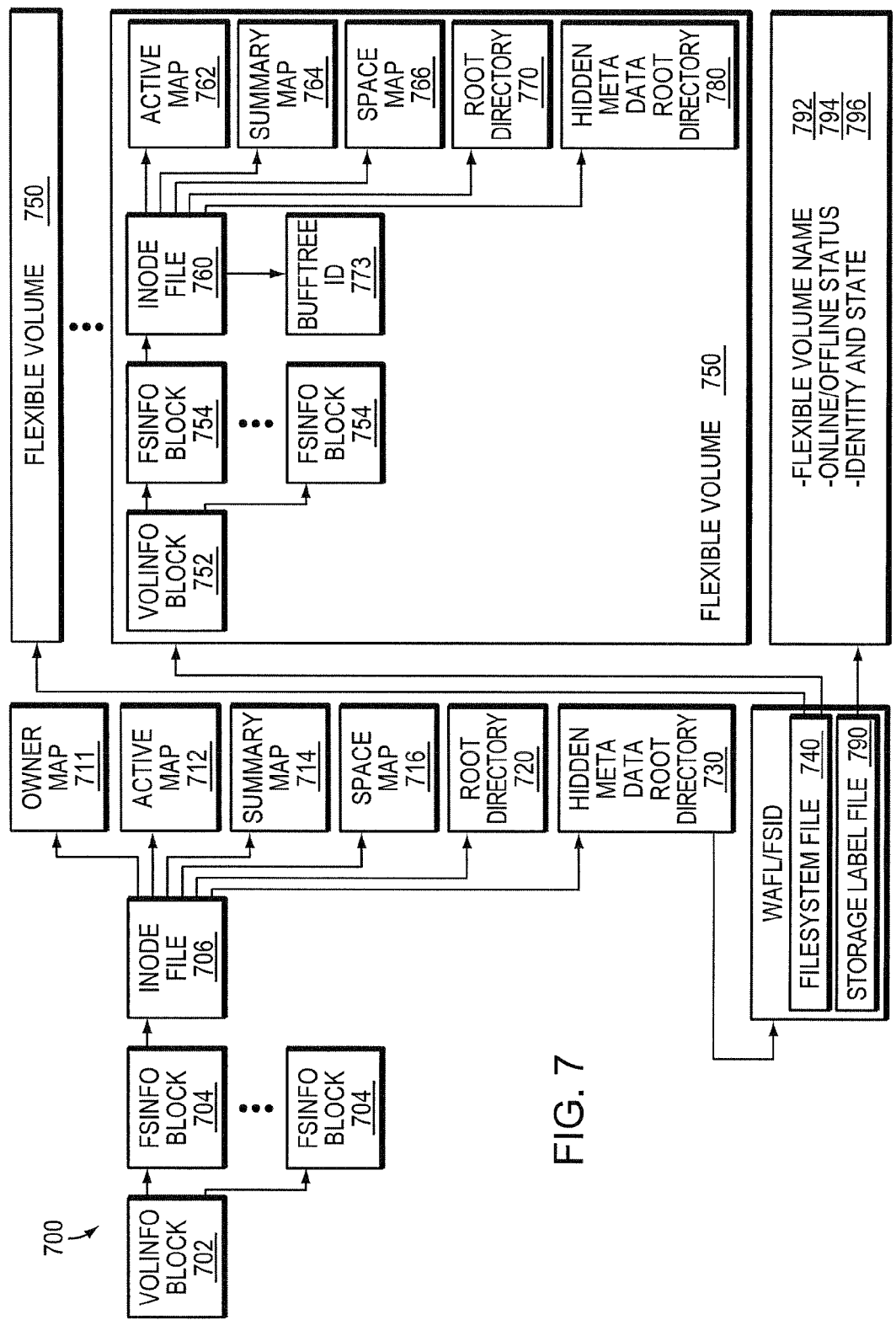
FIG. 7 is a schematic block diagram of an exemplary on-disk data structure of an aggregate in accordance with an embodiment of the present invention.

FIG. 7 is a schematic block diagram of an on-disk representation of an aggregate 700. The storage operating system 200, e.g., the RAID system (disk storage 240), assembles a physical volume of pvbns to create the aggregate 700, with pvbns 1 and 2 comprising a "physical" volinfo block 702 for the aggregate. The volinfo block 702 contains block pointers to fsinfo blocks 704, each of which may represent a snapshot of the aggregate. Each fsinfo block 704 includes a block pointer to an inode file 706 that contains inodes of a plurality of files, including an owner map 710, an active map 712, a summary map 714, and a space map 716, as well as other special meta-data files. In particular, the active map 712 of the aggregate contains a map (e.g., a bitmap) of the pvbns of the aggregate that indicates allocation (allocated or unallocated) of each pvbn of the active file system of the aggregate. The inode file 706 further includes a root directory 720 and a "hidden" meta-data root directory 730, the latter of which includes a name-space having files related to a flexible volume in which users cannot "see" the files. The hidden meta-data root directory includes the WAFL/fsid/ directory structure that contains filesystem file 740 and storage label file 790. Note that root directory 720 in the aggregate is empty; all files related to the aggregate are organized within the hidden meta-data root directory 730.

In addition to being embodied as a container file having level 1 blocks organized as a container map, the filesystem file 740 includes block pointers that reference various file systems embodied as flexible volumes 750. The aggregate 700 maintains these flexible volumes 750 at special reserved inode numbers. Each flexible volume 750 also has special reserved inode numbers within its flexible volume space that are used for, among other things, the block allocation bitmap structures. As noted, the block allocation bit-map structures, e.g., active map 762, summary map 764, and space map 766, are located in each flexible volume. In particular, the active map 762 of a file system contains a map (e.g., a bitmap) of the vvbns of the flexible volume corresponding to that file system that indicates allocation (allocated or unallocated) of each vvbn of the active file system of the flexible volume.

Specifically, each flexible volume 750 has the same inode file structure/content as the aggregate, with the exception that there is no owner map and no WAFL/fsid/filesystem file, storage label file directory structure in a hidden meta-data root directory 780. To that end, each flexible volume 750 has a volinfo block 752 that points to one or more fsinfo blocks 754, each of which may represent a snapshot active file system of the flexible volume. Each fsinfo block, in turn, points to an inode file 760 that, as noted, has the same inode structure/content as the aggregate with the exceptions noted above. Each flexible volume 750 has its own inode file 760 and distinct inode space with corresponding inode numbers, as well as its own root (fsid) directory 770 and subdirectories of files that can be exported separately from other flexible volumes. Also as described herein, each inode file 760 references a corresponding bufftree ID 773.

The storage label file 790 contained within the hidden meta-data root directory 730 of the aggregate is a small file that functions as an analog to a conventional raid label. A raid label includes physical information about the storage system, such as the volume name; that information is loaded into the storage label file 790. Illustratively, the storage label file 790 includes the name 792 of the associated flexible volume 750, the online/offline status 794 of the flexible volume, and other identity and state information 796 of the associated flexible volume (whether it is in the process of being created or destroyed).

It should be noted that while the present invention is described in terms of aggregates and flexible volumes, the principles of the present invention may be applied to other file system organizations. As such, the description of aggregates and flexible volumes should be taken as exemplary only.

D. Persistent Consistency Point Images

The file system illustratively has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point image (PCPI). A (PCPI) is a space conservative, point-in-time read-only image of data accessible by name that provides a consistent image of that data (such as a storage system) at some previous time. More particularly, a PCPI is a point-in-time representation of a storage element, such as an active file system, file, volume, or database, stored on a storage device (e.g., on disk) or other persistent memory and having a name or other identifier that distinguishes it from other PCPIs taken at other points in time.

In the case of the write anywhere file system, a PCPI is always an active file sys-tem image that contains complete information about the file system, including all meta-data. A PCPI can also include other information (meta-data) about the active file system at the particular point in time for which the image is taken. The terms "PCPI" and "snap-shot" may be used interchangeably through out this patent without derogation of Network Appliance's trademark rights. In the example of a WAFL file system, PCPIs are de-scribed in TR3002 File System Design for a NFS File Server System by David Hitz et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz et al., each of which is hereby incorporated by reference as though full set forth herein.

E. Clone Volumes

As noted, a copy or "clone" of a storage volume (i.e., of a "parent" volume) may be created, such as for backup purposes, for writeable copies, etc. Clones, generally, may be initially established by sharing the underlying data blocks (and physical storage) of the parent volume, and as each of the volumes is modified, the shared data blocks may begin to diverge into data that specifically belongs to one or the other volume. An example technique that may be used to copy/clone a volume is described in commonly owned, U.S. patent application Ser. No. 10/837,254, entitled CLONING TECHNIQUE FOR EFFICIENTLY CREATING A COPY OF A VOLUME IN A STORAGE SYSTEM, filed Apr. 30, 2004 by John K. Edwards et al., now issued as U.S. Pat. No. 7,409,511 on Aug. 5, 2008, and in commonly owned, U.S. patent application Ser. No. 10/836,112, entitled WRITEABLE CLONE OF READ-ONLY VOLUME, filed Apr. 30, 2004 by Robert L. Fair et al., now issued as U.S. Pat. No. 7,334,095 on Feb.

19, 2008, the contents of both of which are hereby incorporated by reference in their entirety.

Figure 8:
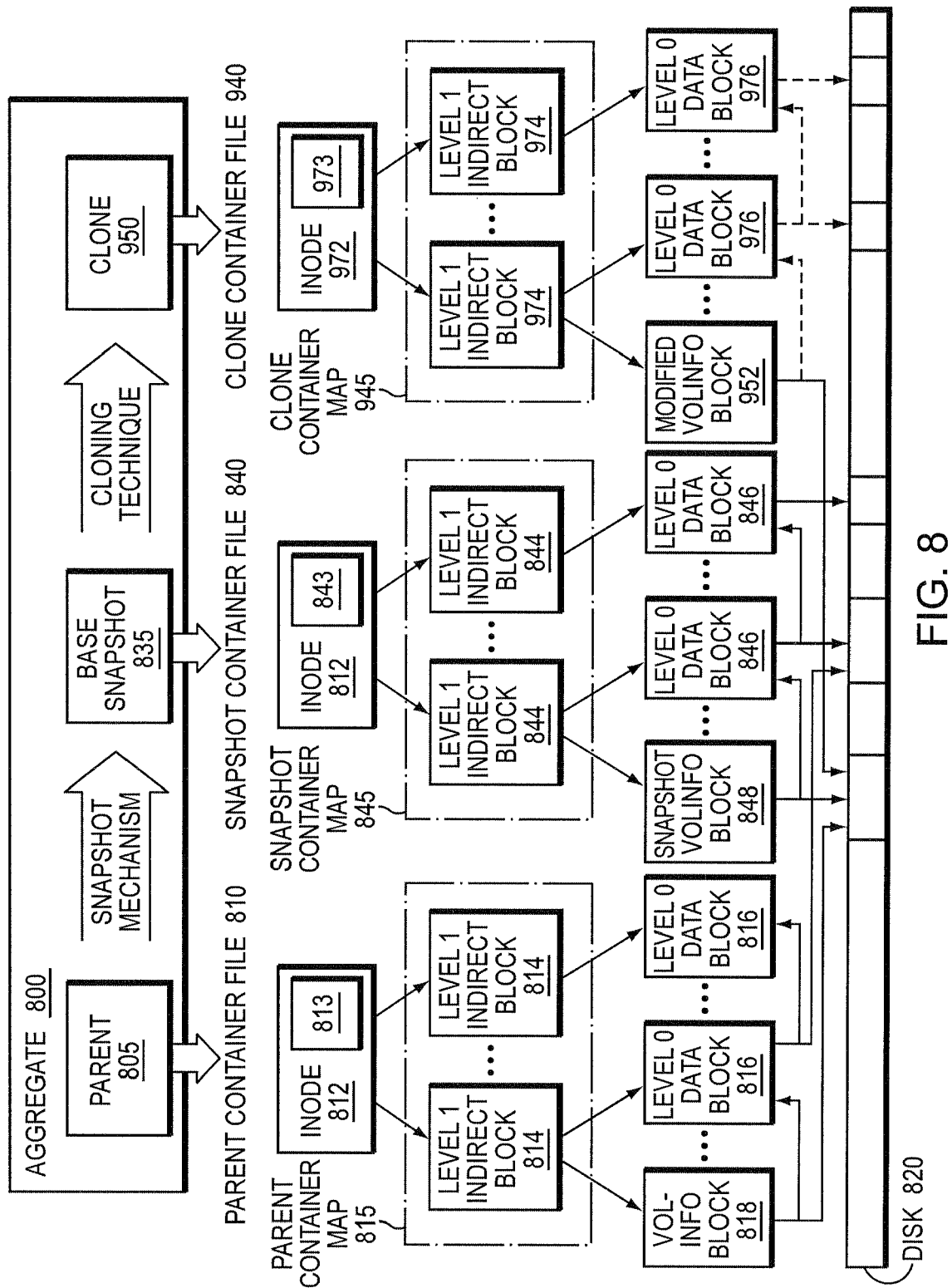
FIG. 8 is a schematic block diagram illustrating an embodiment of an aggregate including a clone in accordance with an embodiment of the present invention.

In particular, FIG. 8 is a schematic block diagram illustrating an embodiment of an aggregate 800 that contains at least one volume (e.g., a flexible volume), hereinafter parent volume 805. The parent volume 805 comprises a parent container file 810 that is represented as a parent buffer tree (with bufftree ID 813) having a plurality of blocks in the aggregate, including inode 812, level 1 indirect blocks 814, which are organized as parent container map 815, and level 0 data blocks 816, which comprise all of the blocks used by the parent volume 805, including a volinfo block 818. Each block includes one or more pointers that reference (point to) physical blocks located on disk 820. In the illustrative embodiment, the pointers within the volume are aggregate block numbers, such as pvbns.

As noted, a volume (such as parent volume 805) generally has the same inode file structure/content as the aggregate, including its own inode file and distinct inode space with corresponding inode numbers, as well as its own root (fsid) directory and subdirectories of files (inodes). To that end, the parent volume 805 has a volinfo block 818 that points to one or more fsinfo blocks that, in turn, points to an inode of an inode file that has the same inode structure/content as the aggregate with the exceptions previously noted. The inode for the inode file contains information describing the inode file associated with a file system, such as file system 265, executing on the parent volume 805. The inode for the inode file may contain a pointer that references (points to) an inode file indirect block containing a set of pointers that reference inodes within its root directory. Each inode contains pointers to indirect blocks, such as level 1 indirect blocks and each indirect block includes pointers to level 0 data blocks.

A snapshot (e.g., a PCPI) can be created in the parent volume 805 in accordance with a conventional snapshot (PCPI) mechanism, e.g., as mentioned above. When the file system 265 generates a parent volume snapshot (hereinafter "base snapshot" 835) of its active file system, an image of the active file system at a point in time (i.e., a consistency point, CP) is "frozen". Note that the base snapshot 835 is contained within and uses blocks in the parent container file 810. As a result, there is no container file for the base snapshot 835 as the snapshot reuses shared blocks in the vvbn space (and pvbn space) with the parent's active file system. However, for purposes of depiction and ease of description, a "snapshot container file 840" is shown and described with respect to FIG. 8. Yet is should be noted that blocks in the parent container file 910 are "held down" by the base snapshot 835 and the clone (described herein) shares the same pvbns.

As illustratively shown, the base snapshot 835 comprises a snapshot container file 840 (similar to parent container file 810) that is represented as a snapshot buffer tree (with bufftree ID 943 that is the same bufftree ID as the parent volume bufftree ID 813) having a plurality of blocks in the aggregate, including inode 812, level 1 indirect blocks 844, which are organized as snapshot container map 845 (similar to parent container map 815), and level 0 data blocks 846, which comprise all of the blocks used by the base snapshot 835, including a snapshot volinfo block 848. The snapshot volinfo block 848 is a duplicate copy of the volinfo block 818 of the parent volume 805. Accordingly, the base snapshot 835 shares data structures, such as fsinfo blocks, as well as inodes, indirect blocks and data blocks of an inode buffer tree, with the active file system on parent volume 805.

In particular, the snapshot mechanism ensures that all blocks of the inode buffer tree remain fixed and all pointers within that buffer tree reference (point to) those fixed blocks. To that end, the physical blocks (pvbns) in the aggregate that are used by the base snapshot 835 remain fixed and cannot be changed as long as the snapshot persists. In general, when a snapshot is created, all blocks that existed at the CP are prevented from being deleted and/or overwritten and any new changes to the blocks in the buffer tree are written elsewhere (to other free blocks). In the case of the base snapshot 935, those changes are written to blocks in a vvbn space in the flexvol's container file and in a pvbn space of the aggregate. Although the snapshotted blocks remain intact, any additional changes to the active file system are written in free blocks of the vvbn and pvbn spaces. Cloning takes advantage of this property.

According to the illustrative cloning technique, the base snapshot 835 is provided either by creating a snapshot within the parent volume or by choosing an existing snapshot from the parent volume. In addition, a new volume (e.g., filesystem file) is created, along with a new fsid subdirectory in the aggregate and a new storage label file. The new volume is embodied as a clone 950 and comprises an appropriately sized clone container file 940 represented as a clone buffer tree (with bufftree ID 973, described herein) having a plurality of blocks in the aggregate, including inode 972, level 1 indirect blocks 974, which are organized as a clone container map 945 and level 0 data blocks 976, which comprise all of the blocks used by the clone. Initially the clone container file 940 has no (zero) data, i.e., it is entirely sparse, and the container map 945 is empty because the only blocks used by the clone are those inherited from the parent volume 805. Moreover, a volinfo block for the clone is created that is a slightly modified version of the volinfo block 848 from the base snapshot 835. The modified volinfo block 952 is written to (store at a level 0 data block of) the container file 940 of the new volume clone.

It should be noted that the clone container file 940 only holds all blocks allocated to the clone 950. The point of a clone is that is uses blocks "owned" by the parent volume 805. The clone container file 940 has "holes" at the locations of any blocks inherited from the parent volume. As an example, assume that an indirect block pointer in a file in the parent volume 805 contains pvbn 100 and vvbn 200. Thus, block 200 in the parent container file 810 is pvbn 100. In clone 950, the indirect block pointers are also pvbn 100 and vvbn 200, but entry 200 in the clone container file 940 is zero ("0"), indicating a hole and that the clone inherited its vvbn 200 from the parent volume. Since entry 200 is 0, the clone "knows" that it could not free the block 100. (In other words, the pvbn pointer in the appropriate container file L1 block at the appropriate index for that vvbn is a zero representing a hole. When a pvbn is freed, it is freed in the context of the virtual volume that owns the pvbn (that wrote it) and a hole may be punched in its container file indirect block atomically.)

Figure 9:
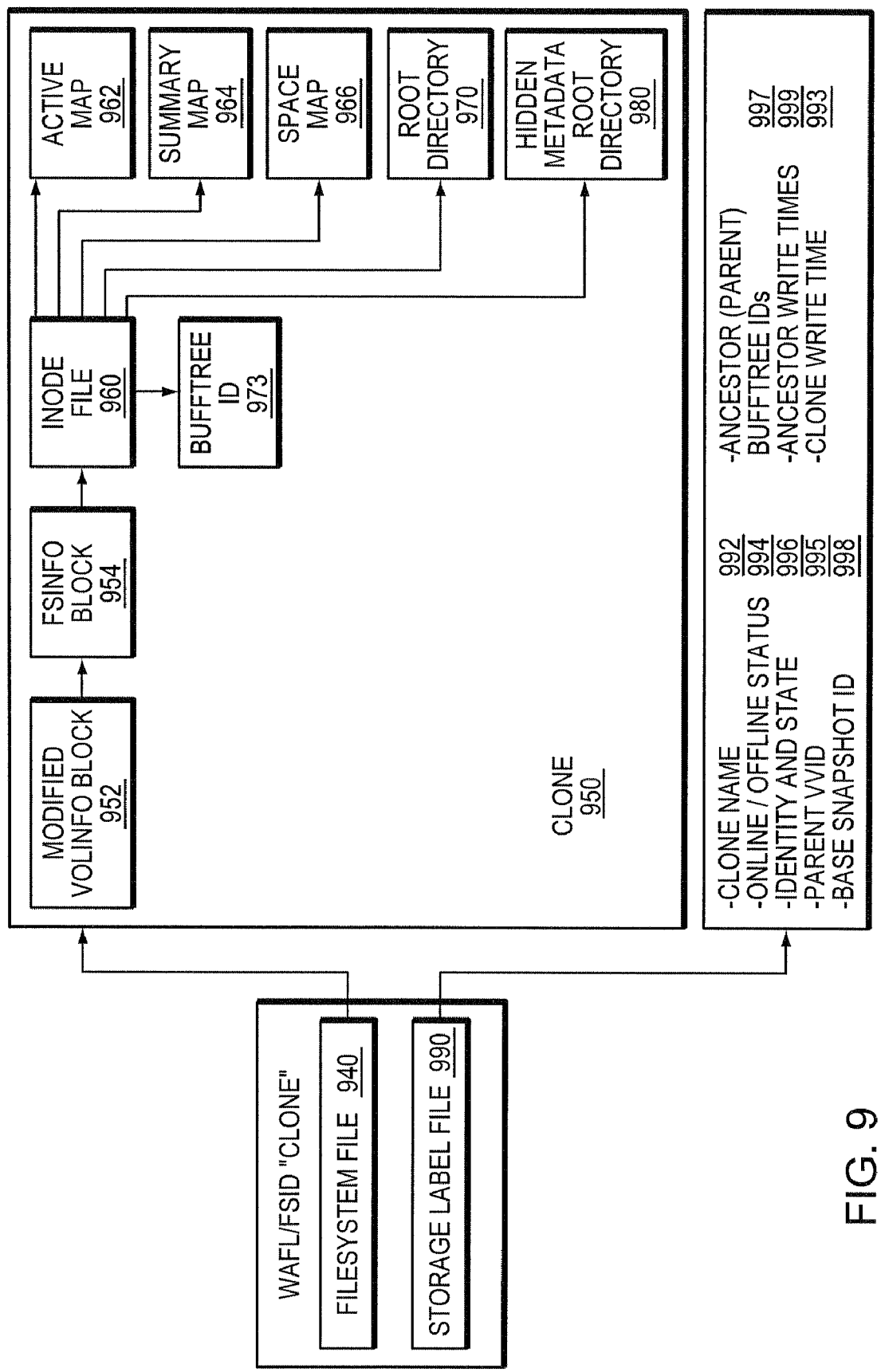
FIG. 9 is a schematic block diagram of an on-disk representation of the clone in accordance with an embodiment of the present invention.

FIG. 9 is a schematic block diagram of an on-disk representation of a clone 950 according to the present invention. The hidden metadata root directory 730 (FIG. 7) in the aggregate 700 is modified to include a new fsid "clone" subdirectory having at least two new files, filesystem file 940 and storage label file 990: WAFL/fsid "clone"/filesystem file, storage label file. As noted, the storage label file is a small file that functions as an analog to a conventional RAID label and, to that end, the new storage label file 990 includes the name 992 of the clone 950, the online/offline status 994 of the clone, and other identity and state information 996 of the associated clone 950.

Similarly, the new filesystem file 940 is a large sparse file that contains all blocks owned by a volume (clone) and, as such, is also referred to as the container file for the clone. The new filesystem file 940 includes a block pointer that references a file system embodied as clone 950. As a volume, the clone 950 has a volume space with special re-served inode numbers that are used for, among other things, the block allocation bitmap structures. Notably, the block allocation bitmap structures, e.g., active map 962, summary map 964, and space map 966, are inherited from the base snapshot 835 (and thus the parent volume 805).

Specifically, the clone 950 includes a volinfo block 952 that points to an fsinfo block that, in turn, points to an inode of inode file that has the same inode structure/content as the aggregate with the exceptions previously noted. The inode for the inode file contains information describing the inode file 960 associated with the file sys-tem, such as file system 265, executing on the clone 950. The inode for the inode file may contain a pointer that references (points to) an inode file indirect block containing a set of pointers that reference inodes within root directory 970 of the clone 950. Each inode contains pointers to indirect blocks, such as level 1 indirect blocks and each indirect block includes pointers to level 0 data blocks.

Referring also to FIG. 8, the snapshot volinfo block 848 from the base snapshot 835 is inserted as a level 0 data block (volinfo block 952) within the container file 940 on the clone. The volinfo block 952 is a slightly modified version of the snapshot volinfo block 848; for example, the volinfo block 952 is modified to delete all snapshots (fsinfo blocks) other than fsinfo block 954 for the base snapshot 835. The summary map 964 is also modified to reflect that all non-cloned snapshots have been removed (deleted) from the clone. The modified volinfo block 952 is thus substantially similar to snapshot volinfo block 848 and, to that end, essentially incorporates the base snapshot into the clone; accordingly the base snapshot (and its associated safeguards) protects the snapshotted blocks from being overwritten. All new changes are written to block locations in the vvbn and pvbn spaces of the base snapshot (parent volume 805) that are not used and, thus, cannot interfere with the clone.

Generally, since the modified volinfo block 952 forms the root of a modified volinfo buffer tree that is similar to a parent volinfo block buffer tree of the parent volume 805, all blocks of the parent volinfo block buffer tree can be accessed when traversing the modified volinfo block buffer tree (described further below). In other words, the snapshot volinfo block 848 stored in a level 0 block of the snapshot container file 840 (actually the parent container file 810) contains pointers that reference other blocks of its buffer tree stored in other level 0 blocks 846 (816) of the container file 840 (810). The pointers within the volinfo block 848 to the other level 0 blocks 846 are physical pointers (pvbns) that reference physical block locations on disk 820. Those parent (snapshot) volinfo buffer tree blocks can be accessed through the modified volinfo block 952 of the clone 950 in the same manner as traversing the snapshot container file tree 840 because the blocks within the modified volinfo block buffer tree are the physical blocks represented by the level 0 data blocks 846 in the snapshot container file 840. (As noted, these blocks are actually in the parent container file 810.) Ultimately, the snapshot volinfo block 848 and the modified volinfo block 952 reference the same physical block locations on disk 820.

The clone 950 may then be instantiated by, e.g., loading a file system associated with the new volume onto the clone and bringing the clone "online", with the only blocks owned by the clone comprising its modified volinfo block. The file system, such as file system 265, executes on the clone as it would on a typical volume, such as the parent volume. In fact, the file system within the clone resembles the file system within the base snapshot, since they comprise substantially the same blocks on disk. The resulting clone 950 is thus a "full-fledged" volume, i.e., it can service storage (read and write) requests and has its own logical properties, such as snapshot operation functionality, that enables the clone to be snapshotted, snap restored, snapmirrored, and otherwise manipulated as any other volume. A restriction is that the base snapshot 835 cannot be deleted in the parent volume 805 while the clone exists. As a result, the cloning technique enables the clone and parent volume to share on-disk blocks of data in a zero-copy fashion, similar to a conventional snapshot, while also allowing for modifications (unlike the conventional snapshot).

Notably, a fundamental property of the cloning technique is that the base snapshot 835 is common among the clone 950 and its parent volume 805 and, thus, cannot be deleted or freed in the parent volume while the clone exists. That is, all blocks shared between the clone and its parent volume are blocks within that base snapshot and, thus, neither may attempt to free or delete those blocks. This restriction also precludes any operation that implicitly makes the snapshot disappear. However, the restriction may be relaxed to allow the clone to "free" the snapshot; in the hybrid volume embodiment, freeing of the snapshot requires checking of the owner map 711 by block free operations on the clone to determine whether the clone or parent owns the block in the aggregate. The clone may only return a block to the aggregate if it owned the block, not if it was inherited from the parent. However in the dual vbn embodiment, reference is made directly to the clone container file 940 to determine the owner of the block, as noted above. (Note that while owner maps are shown and described herein, other embodiments may make use of the container file in a similar manner, as may be appreciated by those skilled in the art.)

Special care is thus taken to prevent the base snapshot 835 from being freed or deleted. According to the technique, when the clone is created, a parent vvid (virtual volume identifier) 995 and base snapshot identifier (ID) 998 are inserted into the storage label file 990 associated with the clone 950. The parent vvid 995 is illustratively the inode number of the parent container file 810, while the base snapshot ID 998 is manifested as a bitmap of snapshot identifiers (an array of bits), one for each possible snapshot. The bitmap is provided because it is possible and sometimes advantageous to inherit multiple snapshots from a parent volume. In this case, the mechanism described herein is generally the same, while leaving pointers to both parent base snapshots (when slightly modifying the volinfo block). In addition, multiple clones 950 may be spawned from the same base snapshot 835; in this case, information is recorded by setting the same snapshot bit in bit fields in both clone's storage label files 990. In general, the file system 265 pre-serves a snapshot by recording in the storage label file 790 (FIG. 7) of each volume 750 whether that file is a clone and, if it is a clone, which volume is its parent and which snapshot(s) it has inherited.

When mounting the aggregate 700, a table (not shown) is constructed having en-tries for all clones in the aggregate. When coming online and before mounting any volumes, the aggregate examines all storage label files 790 of all volumes 750 to determine relationships among the volumes, e.g., whether the volumes are parents or clones. A responsibility of the aggregate is to enforce these relationships and prevent the parent volumes from destroying any base snapshot that forms the basis of a clone. As the volumes 750 come online, the table can be used to "pin" (mark as undeletable) base snapshots of volumes that need to be preserved for clones, while also preventing any sort of destructive operation that may delete those snapshots.

Since the modified volinfo block 952 references physical block locations in the aggregate that cannot be deleted (because they are held down by the base snapshot 835 in the parent volume 805), when the clone 950 comes online, it functions in a manner similar to that of a snap restore arrangement. That is, the modified volinfo block 952 of the clone references a snapshot at a particular point in time (the base snapshot 835) and the clone restores the state of the active file system as represented by that snapshot. The difference between a clone and a conventional snapshot is that write allocation can be per-formed on the clone that essentially allows changes to the base snapshot.

When changes are made to the clone (i.e., blocks of the base snapshot 835), those changes are written out (stored) according to an extended write allocation technique employed by the file system. The extended write allocation technique is described in above-incorporated U.S. patent application Ser. No. 10/836,090, entitled EXTENSION OF WRITE ANYWHERE FILE LAYOUT WRITE ALLOCATION, now issued as U.S. Pat. No. 7,430,571 on Aug. 5, 2008. Broadly stated, a write allocator selects a pvbn in the aggregate for a newly allocated block and selects a vvbn in the clone for that new block using appropriate block allocation bitmaps for both the pvbn and vvbn spaces. As noted, the container file 940 on the clone 950 initially has no data other than the modified volinfo block 952. As write operations occur into the clone, the file system 265 fills in the level 0 blocks 976 of the container file 940 with the changes associated with those write operations.

As further noted, the block allocation bitmaps used by the file system to select the vvbn are inherited from the base snapshot. By inheriting the base snapshot's bitmaps, the file system executing on the clone also inherits the snapshot's vvbn space; any changes made to the clone are thus directed to "empty" or unused blocks in that inherited vvbn space. This avoids any collisions with the blocks in the base snapshot 835. However, the inherited vvbn space diverges from the vvbn space of the base snapshot at the time the clone is created. Therefore, as changes are made to the clone, the container file 940 on the clone starts filling in its level 0 blocks in accordance with the extended write allocation technique. Although the base snapshot and clone now have separate vvbn spaces, some of the vvbns that are used in both spaces reference the same physical blocks in the aggregate. (Note that these references to shared physical blocks may be in the dual vbn indirect blocks for files within flexvols representing shared physical blocks that have not diverged, i.e., been overwritten by the clone.)

For example when using the owner map 711 to translate a pvbn to a vvbn during operation on the clone 950, the file system may discover that the vvid in an entry of the owner map is not the clone's vvid. That is, the owner map 711 may have entries indicating that certain pvbns are owned by the base snapshot (or, more specifically, the parent volume 805) at certain vvbns of the parent's vvbn space. In most cases this will be ignored. If a pvbn entry of the owner map 711 does not indicate the block belongs to the clone, the block has been inherited from the aggregate and the appropriate vvbn is the pvbn. As noted, in the dual vbn embodiment, the question of whether the clone owns a block involves determining whether there is a hole in the clone container file for that block.

As long as the base snapshot 835 exists on the parent volume 805, the parent container file 810 holds onto those blocks and associated mappings. Because the clone 950 has a copy of the base snapshot 835, many of its level 0 blocks reference the same physical blocks as the parent volume. Since these physical blocks are essentially shared between the clone and parent volume, neither of these volumes will attempt to free those blocks as long as the snapshot persists. Note that the owner map 711 may indicate that these shared blocks are owned by the parent volume 805; nevertheless, the clone uses those shared blocks for the same purpose as the parent volume. If an attempt is made to free one of the shared blocks of the base snapshot 835, the attempt will fail because when the file system 265 executing on the clone accesses the owner map 711 to obtain the vvbn associated with the pvbn of the block it is attempting to free (or determines it has a hole in its container file), it examines the vvid of the volume that owns the block. If the parent volume 805 owns the block, the clone cannot free it. Since the base snapshot 835 exists in the parent volume, the parent volume also cannot free that shared block.

As described above, a problem associated with the creation of clone volumes is that clones typically inherit the bufftree ID of their parent volumes in order to be able to read data blocks that are shared with their parents without triggering a context mismatch. In particular, when reading a data block shared with a parent volume, the clone volume (that is, the file system 265 operating on behalf of the clone volume) confirms that the bufftree ID of the data matches the expected bufftree ID which is shared by both the par-ent and the clone volume. If the bufftree ID is not confirmed, a context mismatch has occurred, and the data is determined to be incorrect. Specifically, a problem is possible where multiple volumes share a bufftree ID, and are independently able to move, delete, and create data blocks with corresponding data IDs (e.g., vvbns), the potential for over-lapping data block context signatures exist (i.e., contexts with the same bufftree ID and data ID, but with different data). Specifically, this potential for overlapping may result in data ID "aliasing", which may result in incorrectly returned (and confirmed) data. As such, where data ID aliasing has occurred, it may be impossible to detect incorrect data blocks (e.g., for lost write detection) and to correct an incorrect data block (e.g., to locate the correct data block).

Figure 10:
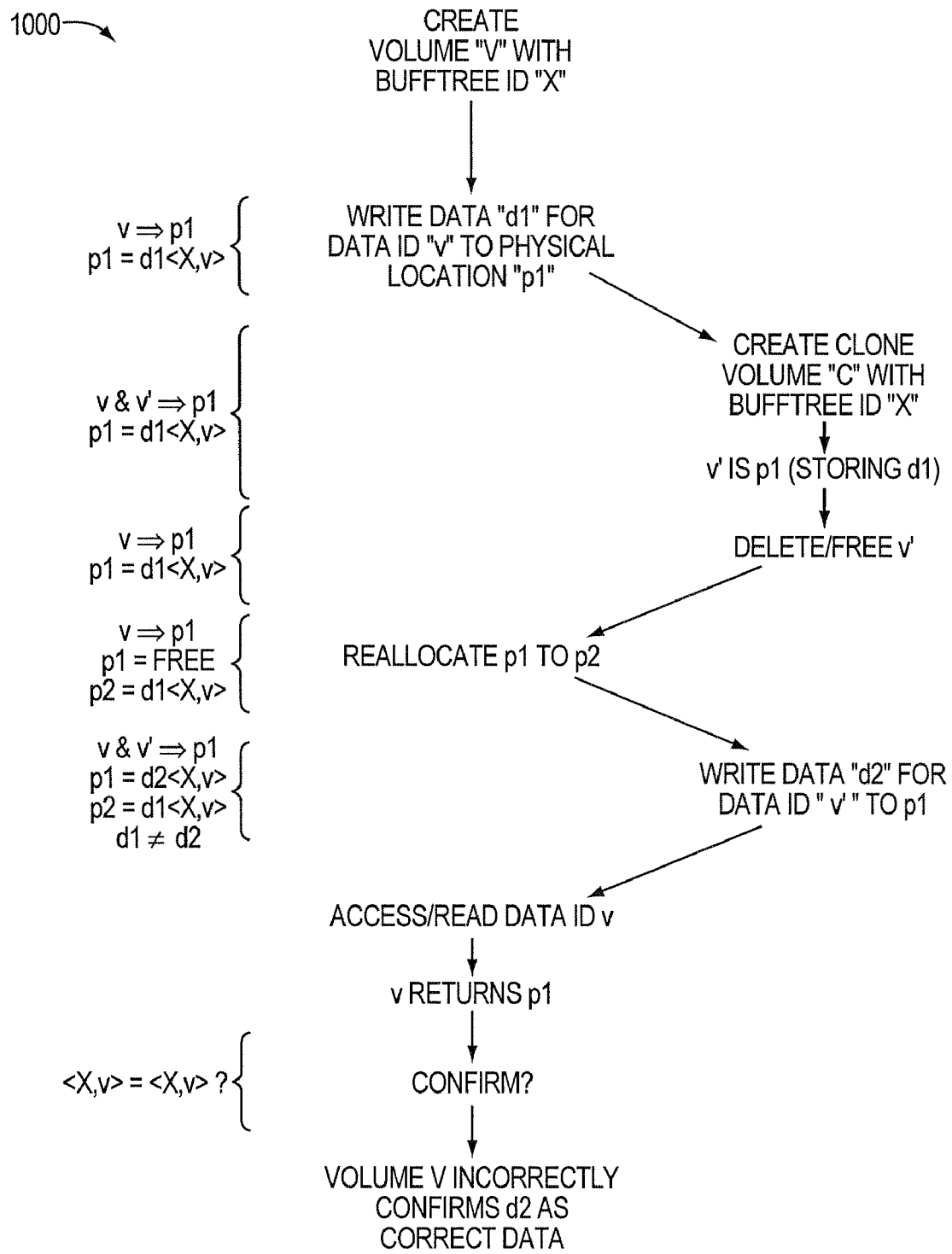
FIG. 10 is a schematic diagram of an illustrative chart showing a data storage pro-cession in accordance with parent and clone volumes.

As an example of data ID aliasing, FIG. 10 is a schematic diagram of an illustrative chart 1000 showing a data storage procession (e.g., from the top down) in accordance with parent and clone volumes, accordingly. In particular, a volume "V" may be established with a bufftree ID "X", and may write a data block (where "d1" represents the actual data within the block) to a physical location "p1" with a data ID of "v". Illustratively, a corresponding context signature may comprise the bufftree ID, data ID, and write time of the data, or "<X, v>" (where write time is omitted for purposes of this ex-ample). (Note that the left side of the chart correspondingly illustrates a state of the storage system for reference.) Assume that a clone volume "C" of volume V is then created, and as mentioned above, is also assigned a bufftree ID "X" of its parent volume V. Notably, in accordance with various cloning techniques, a data ID "v" of the clone volume also references the physical location p1 (i.e., for data d1). (Illustratively, "v'" represents the data ID as used by the clone volume C in order to distinguish the data ID from the "v" used by the parent volume V; however, v and v' represent the same data ID.)

Assume further that the clone volume C deletes its copy (i.e., its reference to) the data block v', such that v' is now free for re-use by the clone volume as a data ID to refer to another data block. (For instance, as described herein, the clone volume may "free" itself from an underlying "snapshot" of the parent volume.) Also, assume that the physical location p1 is reallocated to (i.e., relocated/moved) to a physical location p2, such as for defragmentation, etc. mentioned above, and that the parent volume V is unaware of the change (as conventionally is often the case). Because p1 is now free (unallocated), the clone volume C may utilize that location to write a data block (e.g., a new data block because of the nature of a write-anywhere file layout). Though rare, it is statistically possible that the clone volume C may write a data block (having data "d2") with a data ID of v' into the physical location p1. As such, both v and v' reference (e.g., point to) the physical location p1. However, p1 contains data d2 for the clone volume C, while p2 contains data d1 for the parent volume V. In the event, now, that parent volume V attempts to access (e.g., read) its data block with data ID "v", without knowing of the real-m location, physical location p1 would be returned. To determine whether the correct data has been returned, the parent volume confirms the context signature with what is expected, namely "<X,v>". With the unfortunate circumstance of data ID aliasing, how-ever, clone volume C has written new data (d2) to p1 having the same context signature "<X,v'>" (where v'=v) that parent volume V expects. Accordingly, parent volume V incorrectly confirms the data d2 located at p1, when its data d1 has been unknowingly relocated to p2.

Notably, the example described above is additionally likely to occur in the event where there are many "sibling" clones sharing the same physical storage, or a long hierarchy of clones (i.e., clones of other clones), each sharing the same bufftree ID (e.g., "X"). Accordingly, aliasing may be extended to more than two volumes, thus increasing the statistical probability that the aliasing will occur. There remains a need, therefore, for a technique that uniquely identifies block ownership among related storage volumes (e.g., among parents and clones of a storage volume hierarchy, etc.).

F. Uniquely Identifying Block Context Signatures

The present invention is a system and method for uniquely identifying block con-text signatures in a storage volume hierarchy of a storage system. In particular, a novel technique assigns unique IDs (e.g., bufftree IDs) to volumes of the storage volume hierarchy, yet allows clone volumes to determine that data blocks belong to an appropriate ancestor volume (e.g., and were written by the ancestor volume prior to creation of the clone). In this manner, the novel technique may uniquely identify and accurately deter-mine whether an accessed data block is a correct data block (e.g., alleviating occurrences of data ID aliasing).

Operationally, when volumes 750 are created within an aggregate 700 in a manner described above, each volume is assigned a unique bufftree ID 773 in accordance with the present invention. In particular, clone volumes 950 that are created from parent volumes 805 are assigned a bufftree ID 973 that is unique from the parent volume's buff-tree ID 813. In other words, the bufftree ID for the container file of each particular volume of the aggregate 700 is assigned a unique value. Also, upon creation, a clone volume 950 may be configured to store the bufftree ID 813 of the parent volume, for example, within an ancestor (parent) bufftree ID field 997 of the clone volume's storage label file 990. Notably, when the parent volume 805 is a clone volume of another parent volume, the bufftree IDs of the parent volume's parent may also be stored (i.e., storing the bufftree IDs for all ancestors of the clone volume). In other words, a chain of relation-ship is established between a clone volume and its ancestor volumes in a storage volume hierarchy.

Figure 11:
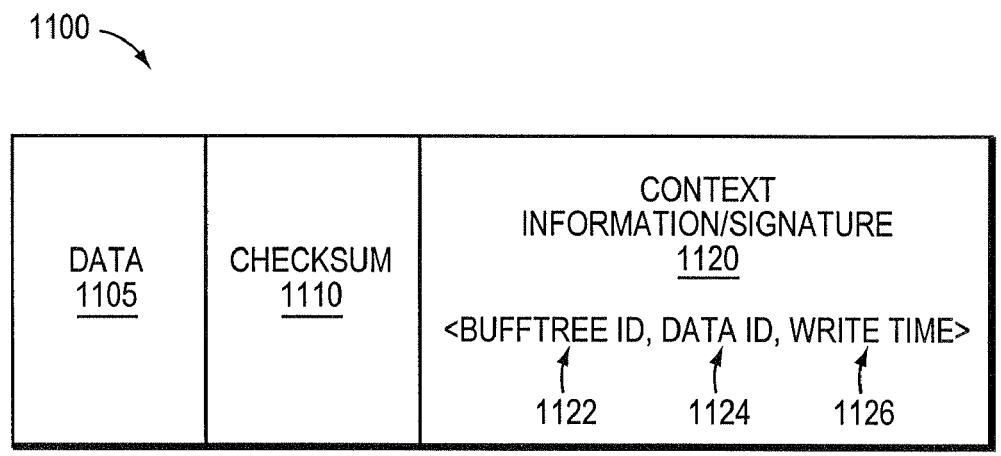
FIG. 11 is a schematic block diagram of an illustrative data block having context information that may be stored in a physical storage location in accordance with one or more embodiments of the present invention.

Illustratively, in accordance with one or more embodiments of the present invention, a file system 265 operating on behalf of a particular volume (e.g., clone volume 950) accesses a data block at a physical storage location. Briefly, FIG. 11 is a schematic block diagram of an illustrative data block 1100 having context information 1120 that may be stored in a physical storage location (e.g., a pvbn) in accordance with one or more embodiments of the present invention. In particular, a data block 1100 may comprise the stored data 1105, a conventional checksum value 1110, and the context information/signature 1120. According to one or more illustrative embodiments, the context information 1120 may comprise a bufftree ID field 1122, data ID field 1124, and a write time field (e.g., timestamp) 1126. For instance, bufftree ID field 1122 may contain the bufftree ID (e.g., for the container file) of a particular volume that wrote/stored the data block 1100, while the data ID field 1124 may contain the data ID used by the particular volume to reference (or point to) the data block 1100. For example, the data ID may be a file block number (fbn) used within the container file which in turn represents a vvbn within the flexible volume, as will be understood by those skilled in the art and as de-scribed herein. Further, the write time field 1126 may contain a time at which the data block was written/stored, such as a generation count or consistency point (CP) count of the aggregate 700 (the use of which is described further below).

As mentioned above, upon accessing a data block, the file system 265 checks the context information 1120 to determine whether there is context mismatch. In particular, if the data ID 1124 of the accessed data block 1100 confirms (matches) with an expected data ID (e.g., a vvbn used to reference the data block), and if a bufftree ID 1122 matches the unique bufftree ID of the volume (e.g., 973), then the data is determined to be correct data. If the data ID is expected, but the bufftree ID of the accessed data block does not confirm with the unique bufftree ID of the volume, then the bufftree ID of the accessed data block may be compared against any ancestor bufftree IDs (e.g., parent volumes, parents of parent volumes, etc.) of the volume accessing the data block, such as from ancestor bufftree ID list 997. If the bufftree ID of the accessed data block confirms with a bufftree ID of an ancestor volume (notably, it would match only one as each are uniquely identified), the data block may be determined to be a correct data block. In other words, the file system 265 may search the chain of ancestor volumes during context checking to determine whether the context matches a valid data entry to be accessed by the volume (e.g., by the clone). If at least one of either the data ID or the bufftree ID of the data block are unconfirmed, however, then the data block is an incorrect data block. Notably, as described below, the file system 265 may attempt to locate the correct version of the determined incorrect data block at a new physical storage location.

Figure 12:
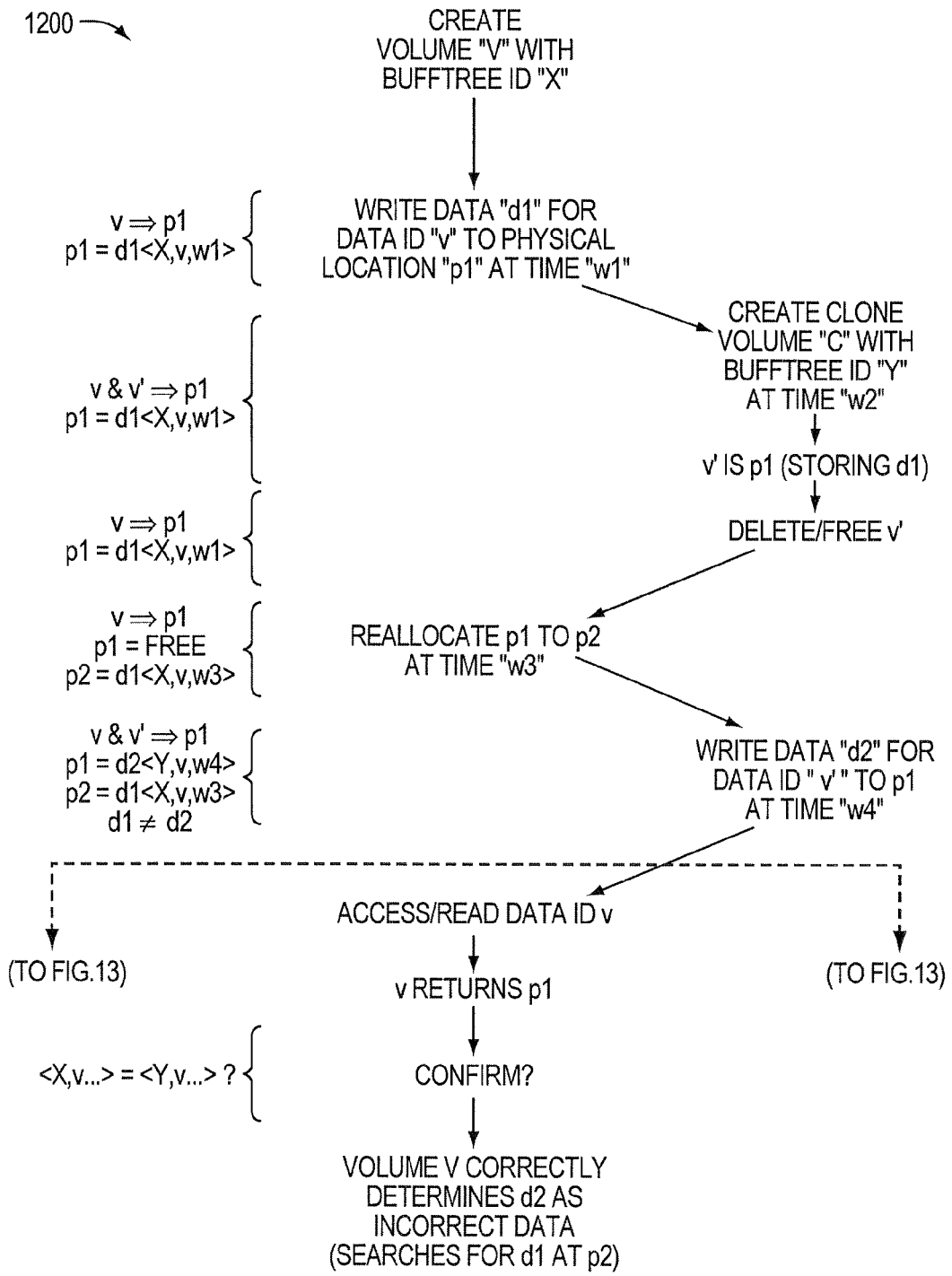
FIG. 12 is a schematic diagram of an illustrative chart showing a data storage pro-cession in accordance with uniquely identified block context signatures in accordance with one or more embodiments of the present invention.

As an example, FIG. 12 is a schematic diagram of an illustrative chart 1200 showing a data storage procession in accordance with uniquely identified block context signatures in accordance with one or more embodiments of the present invention. In particular, in a similar manner to FIG. 10 described above, a volume "V" may be established with a bufftree ID "X", and may write a data block 1100 (where "d1" represents the actual data within the block) to a physical location "p1" (e.g., a pvbn of the aggregate 700) with a data ID of "v" (e.g., a vvbn), and at a time "w1". Illustratively, a corresponding context signature 1120 may comprise the bufftree ID 1122, data ID 1124, and write time 1126 of the data, or "<X, v, w1>". (Note that the left side of the chart again correspondingly illustrates a state of the storage system for reference.) Assume that a clone volume "C" of volume V is then created (at time "w2"), and in accordance with the present invention, is assigned a unique bufftree ID "Y". Notably, in accordance with various cloning techniques described herein, a data ID "v" of the clone volume also references the physical location p1 (i.e., for data d1). (Illustratively, "v'" represents the data ID as used by the clone volume C in order to distinguish the data ID from the "v" used by the parent volume V; however, v and v' represent the same data ID.)

Assume further that the clone volume C deletes its copy (i.e., its reference to) the data block v', such that v' is now free for re-use by the clone volume as a data ID to refer to another data block. (For instance, as described herein, the clone volume may "free" itself from an underlying "snapshot" of the parent volume, e.g., by deleting the snapshot that it inherited at clone creation time.) Also, assume that the physical location p1 is real-located to (i.e., relocated/moved) to a physical location p2, such as for defragmentation, etc., and that the parent volume V is unaware of the change (as conventionally is often the case). Note that due to the reallocation, the context information 1120 of the moved data block may now include a new write time 1126 of "w3".

Because p1 is now free (unallocated), the clone volume C may utilize that location to write a data block. Though rare, it is statistically possible that the clone volume C may write a data block (having data "d2") with a data ID of v' into the physical location p1 (and at time "w4"). As such, both v and v' reference (e.g., point to) the physical location p1. However, p1 contains data d2 for the clone volume C, while p2 contains data d1 for the parent volume V. Contrary to the problems associated with shared bufftree IDs presented in FIG. 10, however, in the event that parent volume V attempts to access (e.g., read) its data block with data ID "v", without knowing of the reallocation, physical location p1 would be returned. To determine whether the correct data has been returned, the parent volume confirms the context signature 1120 with what is expected, namely at least the bufftree ID and data ID or "<X,v>". Advantageously, in accordance with the present invention, clone volume C has written new data (d2) to p1 having a different context signature "<Y,v'>" (where v'=v), thus having a bufftree ID 1122 that is unexpected (i.e., not the bufftree ID of the parent volume V). Accordingly, parent volume V determines that p1 does not contain the requested data d2, and may investigate further to determine (e.g., described below) that data d2 has been unknowingly relocated to p2.

Notably, while the above solution of uniquely identifying bufftree IDs of volumes within an aggregate may alleviate a greater proportion of data ID aliasing instances, there remains a possibility (though much less likely) that a reallocated block is incorrectly determined to be a correct data block. For instance, according to the present invention, if a file system 265 attempts to read/access a data block 1100 for a clone volume 950, a buff-tree ID 1122 within the context information is compared to the bufftree ID 973 of the clone volume. If the bufftree ID does not match, then the clone volume compares the bufftree ID 1122 with bufftree IDs of its ancestor (e.g., parent, etc.) volumes to determine a match. For most situations, this operation functions seamlessly to uniquely identify context signatures and to properly confirm data. However, there are circumstances that may exists where the parent volume has written data to a physical storage location that is being incorrectly accessed by a clone volume, after creation of the clone volume (de-scribed in further detail below, e.g., with reference to FIG. 13).

In accordance with one or more embodiments of the present invention, therefore, the data block 1100 may have an associated write time 1126 corresponding to a time at which the data was stored, and the volume accessing the data block 1100 (e.g., clone volume 950) may also have an associated write time 993 corresponding to a time at which the volume was created. In this manner, if the bufftree ID of the accessed data block con-firms with a bufftree ID of an ancestor volume, the write times (of the context information 1120 and the accessing volume 993) may be used to determine whether the write time of the data block is prior to creation of the volume for which the data block is accessed. Specifically, if the data block was written before creation of the clone volume, the clone volume copied the previously written data block, and the data block is a correct data block. If, however, the data block was written after creation of the clone volume, the data block has since been reallocated and rewritten by an ancestor volume, and is an incorrect data block.

Figure 13:
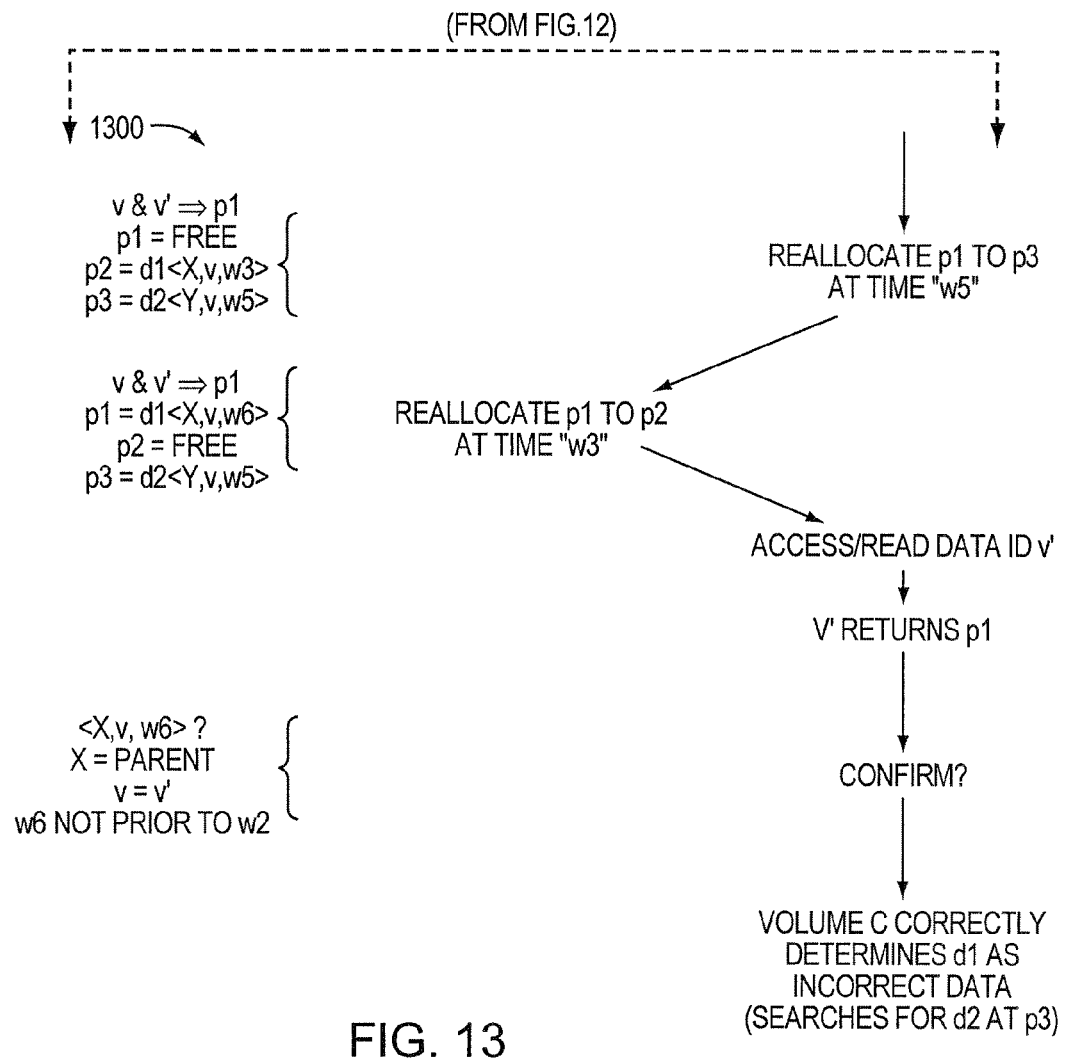
FIG. 13 is a schematic diagram of an illustrative chart showing a data storage pro-cession in accordance with uniquely identified block context signatures in accordance with one or more embodiments of the present invention.

As an example, FIG. 13 is a schematic diagram of an illustrative chart 1300 showing a data storage procession in accordance with uniquely identified block context signatures in accordance with one or more embodiments of the present invention. In particular, assume that FIG. 13 continues from the event occurring above the dashed line shown in FIG. 12 described above, that is, after the clone volume C writes data d2 to p1. In chart 1300, further assume that p1 (with clone volume C's data d2) is reallocated to a new physical storage location "p3" at a time "w5". Now, according to the state of the illustrative storage system, v and v' both reference p1, p1 is a free block, p2 contains data d1 with context <X, v, w3>, and p3 contains data d2 with context <Y, v', w5>. In the rare occasion, then, that p2 is reallocated back to p1 (e.g., at time "w6"), p1 (notably referenced by both v and v') contains data d1 with context <X, v, w6>.

In the event that the file system 265 attempts to read/access the data block referenced by v' for the clone volume C, physical storage location p1 is returned. Through context checking of signature 1120, the file system may determine that the bufftree ID 1122 does not match the clone volume's bufftree ID 973 "Y", but does match an ancestor volume's bufftree ID (as stored in list 997), e.g., the parent volume's bufftree ID "X". Without utilizing the write time 1126 of the context information, the context check by the file system 265 will determine that the data is correct, when in fact, it is not (i.e., d1 is not d2). In accordance with the present invention, then, by determining whether the write time 1126 of the accessed data block 1100 is after the creation of the accessing volume (i.e., after creation of clone volume C according to its stored write time 993, w2), the file system 265 may determine whether the data is valid/correct. If the data is incorrect, the file system may attempt to locate the correct data, described below.

Notably, in the event that the accessing volume (e.g., clone volume C) has multiple ancestor volumes (e.g., parents of parent volumes, etc.), the file system may be configured to more specifically confirm that the write times of each ancestor volume (e.g., stored in ancestor volume write times field 999) respectively indicates that the write time 1126 of the data block 1100 represents an appropriately copied/cloned progression. For instance, assume volume 1 is a parent of volume 2, which is a parent of volume 3. Also, assume that volume 1 writes a data block after creation of volume 2, but before the creation of volume 3. As such, comparing the write time of the volume 1 block to the creation time of volume 3 may not correctly reflect the data dependencies between clones that are advantageously used in accordance with the present invention. As such, further clarifications may need to be performed to ensure that the chain of hierarchical ancestry was appropriately confirmed with regard to write times. For example, the file system 265 may need to confirm that the data was written by volume 1 before the creation of volume 2 which was before the creation of volume 3, etc.

As mentioned above, once an accessed data block 1100 is determined to be incorrect data, the file system 265 may search for the correct data. Illustratively, the file sys-tem may query a centralized database (e.g., a container file for the volume as described above) for a reference to a correct (e.g., new) physical storage location of the relocated data. If the centralized database (container file) confirms the accessed physical storage location (that is, the container file also references the incorrect data block), then the file system may conclude that the correct data has been lost. In particular, as described above, the container file contains a mapping of data IDs (vvbns) to physical storage locations (pvbns), which is maintained up-to-date during data block reallocations, as may be understood by those skilled in the art.

Figure 14:
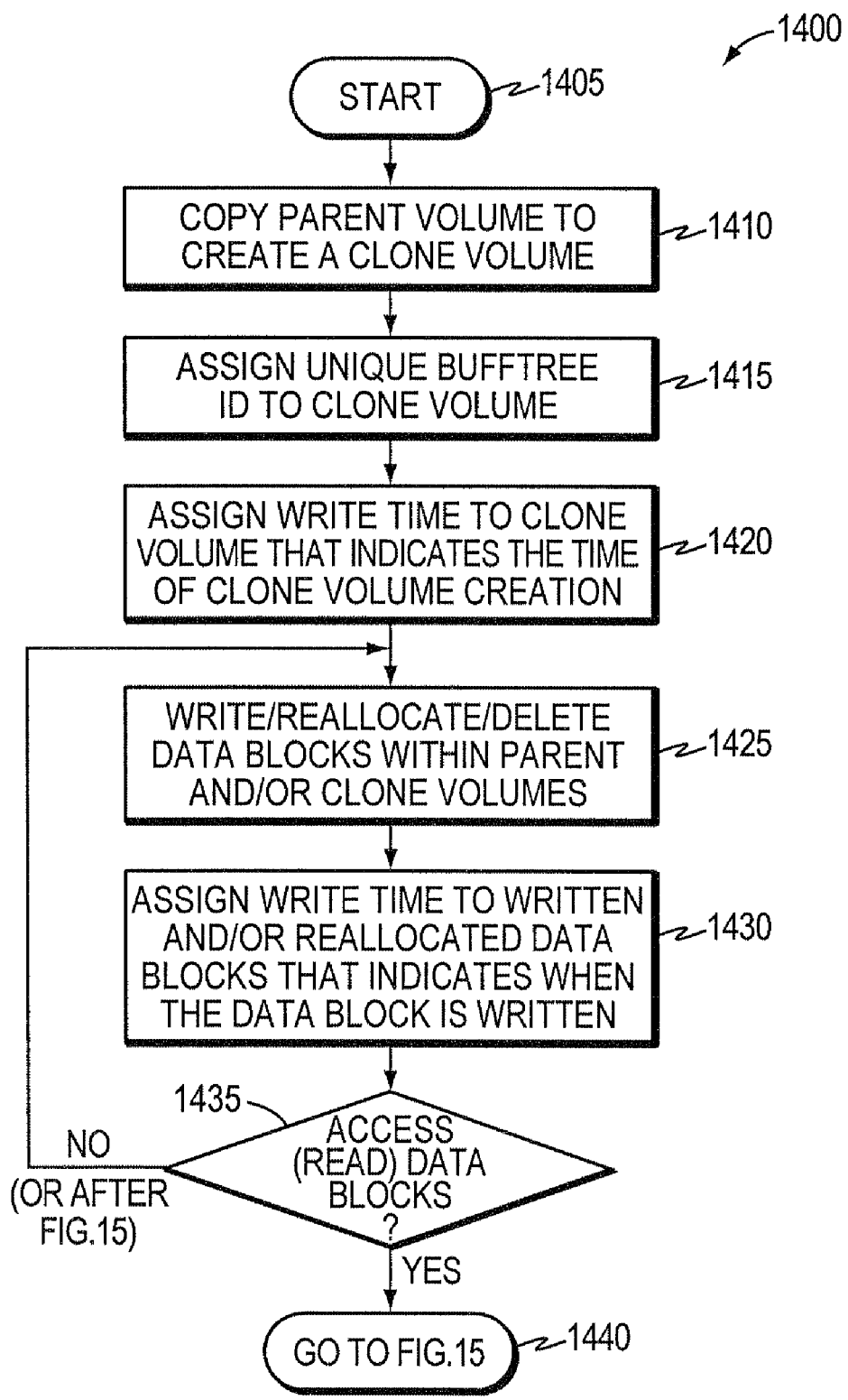
FIG. 14 is a flowchart detailing the steps of a procedure for use with uniquely identifying block context signatures in a storage volume hierarchy of a storage system in accordance with one or more embodiments of the present invention.

FIG. 14 is a flowchart detailing the steps of a procedure 1400 for use with uniquely identifying block context signatures in a storage volume hierarchy of a storage system in accordance with one or more embodiments of the present invention. The procedure 1400 begins in step 1405 and continues to step 1410 where a parent volume (e.g., volume V) is copied to create a clone volume (e.g., volume C) (e.g., by file system 265). In step 1415, a unique bufftree ID is assigned to the clone volume (e.g., "Y"), specifically unique from the parent volume's ID (e.g., "X"). Also, in accordance with one or more embodiments of the present invention, a write time may be assigned to the clone volume in step 1420 that indicates the time of clone volume creation.

In step 1425, data blocks within the parent and/or clone volumes may be written, deleted, and/or reallocated in step 1425 by the file system 265, as described above. In particular, data blocks may be written and/or deleted for a particular volume (e.g., the clone volume C) or by another volume (e.g., the parent volume V), while data blocks may be reallocated without knowledge of the volumes, as also described above. Notably, for each time a data block is written (e.g., in response to a write or a reallocation), a write time is assigned to the data blocks in step 1430 that indicates when the data block is writ-ten (e.g., stored within context information 1120, mentioned above). If data blocks are not accessed by the volumes (e.g., reallocation without volume intervention) in step 1435, then the procedure 1400 may return to step 1425 to reallocate data blocks. If data blocks are accessed (e.g., read) in step 1435, then the procedure 1400 continues in step 1440 to procedure 1500 of FIG. 15, described below. (Notably, according to the illustrative WAFL file system 265, a data block need not be accessed prior to being written. How-ever, where other embodiments may utilize a write-in-place file system, a read-before-write implementation may require the procedure described in FIG. 15 below prior to writing the data block in step 1425.)

Figure 15:
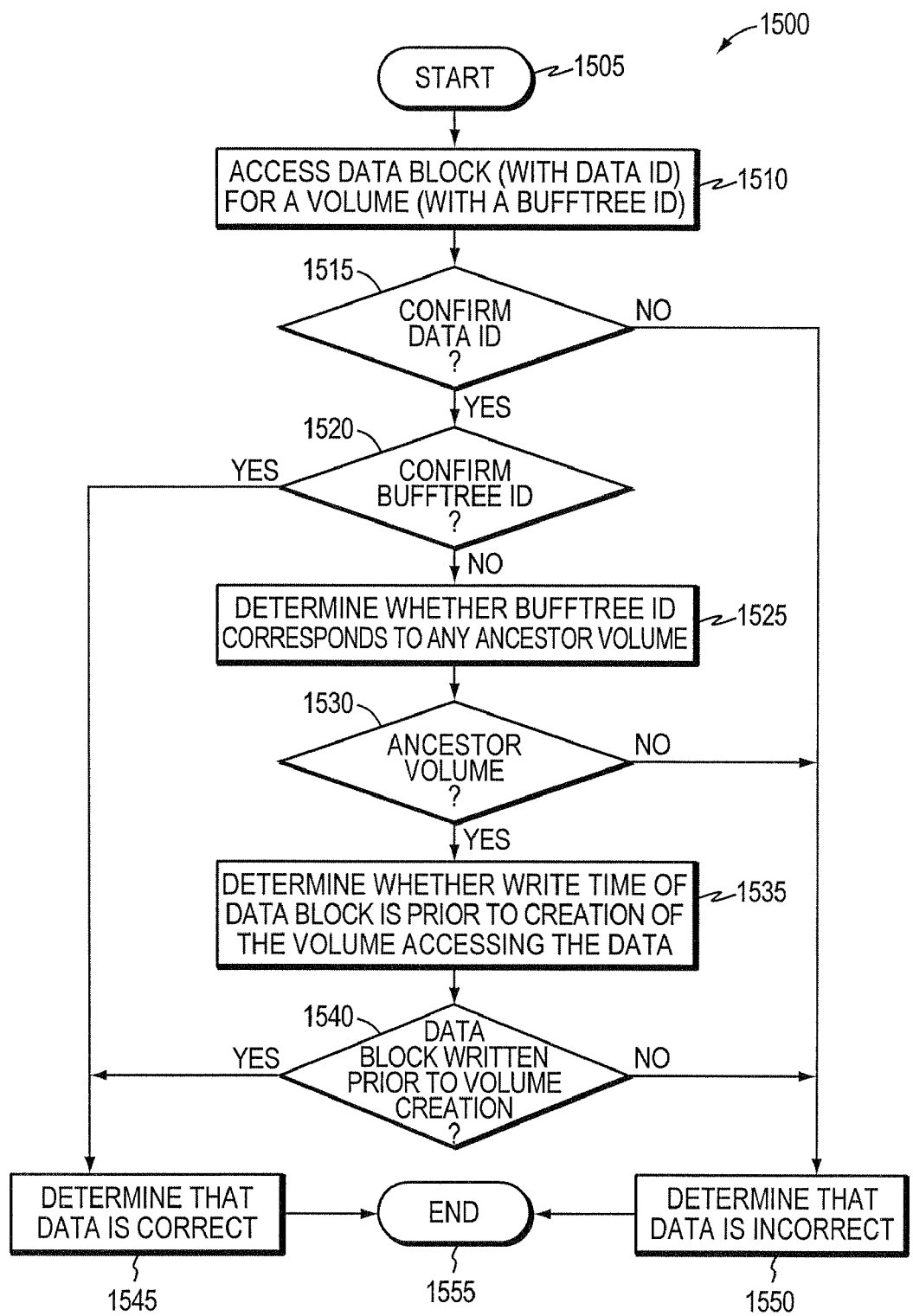
FIG. 15 is a flowchart detailing the steps of a procedure for use with uniquely identifying block context signatures in a storage volume hierarchy of a storage system in accordance with one or more embodiments of the present invention.

In particular, FIG. 15 is a flowchart detailing the steps of a procedure 1500 for use with uniquely identifying block context signatures in a storage volume hierarchy of a storage system in accordance with one or more embodiments of the present invention. The procedure 1500 begins in step 1505 and continues to step 1510 where a volume (that is, e.g., where a file system 265 operating on behalf of a volume) accesses a data block. For instance, clone volume C (with ID "Y") may wish to access a data block with data ID (e.g., vvbn) "v" from a physical location (e.g., pvbn) "p1" within the aggregate 700, as mentioned above. In step 1515, the file system attempts to confirm the data ID 1124 as obtained within the context information 1120 from the accessed data block at p1, and if the data ID does not match the expected data ID (e.g., "v"), then the data is determined to be incorrect in step 1550 (below). If the data ID is confirmed (e.g., matches the expected ID), then the file system 265 attempts to confirm the bufftree ID 1122 of the context information 1120 in step 1520 based on the volume for which the data block is being accessed (e.g., clone volume C, bufftree ID "Y"). If the bufftree ID is also confirmed (that is, if the context information comprises <Y, v>), then the data is determined to be correct in step 1545.

If, on the other hand, the bufftree ID does not match the accessing volume's ID (e.g., is not "Y"), then in step 1525, the file system 265 determines whether the bufftree ID 1122 corresponds to a bufftree ID of any ancestor volumes (i.e., if any exist). For instance, as described above, the file system 265 checks the stored list of ancestor bufftree IDs 997 for the volume accessing the data block to determine whether there is a matching ID. For example, if the returned bufftree ID 1122 of the context information X00 is "X", and parent volume V's bufftree ID is "X", then the file system may conclude that there is a corresponding ancestor volume with the bufftree ID from the context information in step 1530. If not, the data is determined to be incorrect in step 1550. However, if the bufftree ID does belong to an ancestor volume in step 1530, then the data may be deter-mined to be correct data, accordingly.

Illustratively, in accordance with one or more embodiments of the present invention, determining that data is correct after step 1530 comprises more detailed steps in procedure 1500. In particular, as described above, the file system 265 may need to determine in step 1535 whether a write time (e.g., 1126 of context information 1120) of the data block is prior to creation of the volume accessing the data (e.g., the creation/write time of clone volume C, 993). If the data block was not written prior to the volume's creation in step 1540, then the data is incorrect in step 1550 (i.e., was written by an ancestor volume after the clone was created). If, however, the data block was written prior to the volume's creation in step 1540, then the data is determined to be correct in step 1545, accordingly. (Note that as mentioned above, further clarifications may need to be performed to ensure that the chain of hierarchical ancestry was appropriately confirmed with regard to write times.) The procedure 1500 ends in step 1555. Furthermore, though not explicitly shown as a procedure herein, once a data block is determined to be incorrect data, the file system 265 may search for the correct data, such as by accessing a con-tamer file for a reference to the relocated data as described above, or by concluding that the correct data has been lost (e.g., where the container file still references the physical storage location p1).

To again summarize, the present invention provides a system and method for uniquely identifying block context signatures in a storage volume hierarchy of a storage system. In particular, a novel technique is provided that allows for fine-grained context checking, particularly for clone volumes and their ancestors (e.g., parent volumes) and sibling volumes (e.g., clones of a same parent volume). By assigning unique bufftree IDs to volumes of the storage volume hierarchy, yet allowing clone volumes to determine that data blocks belong to an appropriate ancestor volume (e.g., and were written by the ancestor volume prior to creation of the clone), the novel technique may uniquely identify and accurately determine whether an accessed data block is a correct data block (e.g., alleviating occurrences of data ID aliasing).

In addition, the present invention advantageously allows for more finely grained context checking, thus alleviating occurrences of data ID aliasing, particularly for clone volumes and their related siblings and ancestors (parents). Also, the novel techniques described herein do not (generally)

result in a "space penalty", such that data IDs (vvbns) and physical storage locations (pvbns) may be reused without fear of data ID aliasing.

While there have been shown and described illustrative embodiments that uniquely identify block context signatures in a storage volume hierarchy of a storage sys-tem, it is to be understood that various other adaptations and modifications may be made within the spirit and scope of the present invention. For example, the embodiments have been shown and described herein with/using clone volumes created from snap-shots/PCPIs of a parent volume. However, the embodiments of the invention in its broader sense are not so limited, and may, in fact, be used with any appropriately established clone volume that may benefit from a unique bufftree ID and the associated techniques described herein, such as clone volumes created directly from parent volumes (i.e., without an intermediate snapshot/PCPI volume). Also, while the above description is specifically described using clone, parent, ancestor, and sibling volumes as related volumes, other related volumes may advantageously utilize the techniques described herein (e.g., for de-duplication across volumes, etc.), as may be appreciated by those skilled in the art. Further, while volumes are illustratively identified by their bufftree IDs, the techniques described herein may be equally applicable to any type of volume identifier, and the volume need not comprise a tree structure or, specifically, a bufftree.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly, this description is to be taken only by way of example and not to otherwise limit the scope of the invention. It is thus the object of the appended claims to cover such variations and modifications as come within the true spirit and scope of the invention.

What is claimed is:

1. A computer-implemented method, comprising:
assigning, by a processor executing a storage operating system of a computer, a first unique buffer tree identifier (bufftree ID) to a first volume of the computer and assigning a second unique bufftree ID to an ancestor volume of the first volume;
accessing a data block of the first volume by the storage operating system, and in response, determining whether a data ID of the data block matches an expected data ID for the first volume;
if the data ID of the data block matches the expected data ID, determining whether a volume ID of the data block matches the first unique bufftree ID of the first volume;
if the volume ID of the data block matches the first unique bufftree ID of the first volume, determining that the data block is a correct data block;
if the volume ID of the data block does not match the first unique bufftree ID of the first volume, determining whether the volume ID of the data block matches the second unique bufftree ID of the ancestor volume;
if the volume ID of the data block match the second unique bufftree ID of the ancestor volume, determining that the data block is the correct data block; and
if at least one of the data ID and the volume ID of the data block do not match, determining that the data block is an incorrect data block.

2. The computer-implemented method as in claim 1, wherein the data block has a write time corresponding to a time at which the data block was stored, and wherein determining that the data block is the correct data block if the volume ID of the data block matches the second unique bufftree ID of the ancestor volume, further comprises:
determining whether the write time of the data block is prior to creation of the ancestor volume;
if so, determining that the data block is the correct data block; and
if not, determining that the data block is the incorrect data block.

3. The computer-implemented method as in claim 1, wherein the data ID and volume ID of the data block are contained within a context signature of the data block.

4. The computer-implemented method as in claim 1, wherein the data ID comprises a virtual volume block number (vvbn) and a physical location of the data block is associated with a physical virtual block number (pvbn).

5. The computer-implemented method as in claim 1, wherein the data block is stored at a physical location as part of an aggregate of physical locations shared among a plurality of volumes, the plurality of volumes comprising the first volume.

6. The computer-implemented method as in claim 5, further comprising:
assigning unique volume IDs to one or more volumes of the aggregate.

7. The computer-implemented method as in claim 1, wherein the ancestor volume comprises a clone volume of the first volume.

8. The computer-implemented method as in claim 1, wherein the first volume is a clone volume of a parent volume.

9. The computer-implemented method as in claim 1, wherein the incorrect data block is determined in response to reallocation of the data block from a first physical storage location to another physical storage location.

10. The computer-implemented method as in claim 9, further comprising:
in response to determining that the data block is the incorrect data block, querying a centralized database operatively connected to the computer to determine a correct physical storage location of the data block.

11. The computer-implemented method as in claim 10, further comprising:
determining that the centralized database matches the physical storage location of the incorrect data block; and
in response, determining that the data block is lost.

12. The computer-implemented method as in claim 10, further comprising:
determining that the centralized database contains a new physical storage location of the data block; and
in response, accessing the data block at the new physical storage location.

13. The computer-implemented method as in claim 10, wherein the centralized database comprises a container file of the first volume, the container file further comprising a mapping of data block data IDs to physical storage locations on one or more storage devices.

14. The computer-implemented method as in claim 1, wherein the volume ID comprises a buffer tree ID (bufftree ID).

15. A computer-implemented method, comprising:
creating, by a processor executing a storage operating system of a computer, a clone volume from a parent volume, the parent volume comprising a first unique bufftree identifier (ID);

assigning a second unique bufftree ID to the clone volume that is unique from the first unique bufftree ID and unique from any other unique bufftree IDs of ancestor volumes within a volume hierarchy of the clone;

accessing a data block within the volume hierarchy of the clone; and determining that the data block is a correctly accessed data block if a volume ID of where the data block is stored matches one of the unique bufftree IDs of any volume within the volume hierarchy of the clone.

16. The computer-implemented method as in claim 15, further comprising:

determining that the data block is the correctly accessed data block if the volume ID matches the unique bufftree ID of either the parent volume or any ancestor volume in the volume hierarchy of the clone and if a write time of the data block is prior to creation of the clone volume.

17. The computer-implemented method as in claim 16, wherein at least one of the bufftree IDs comprises the volume ID of where the data block is stored.

18. A storage system, comprising:

a processor operatively connected to the storage system;

a parent volume operatively connected to the storage system and configured to store data blocks, the parent volume comprising a first unique bufftree identifier (ID) in an inode of the parent volume;

a clone volume operatively connected to the storage system and created from the parent volume, the clone volume comprising a second unique bufftree ID in an inode of the clone volume that is unique from the first bufftree ID of the parent volume; and the processor configured to execute a storage operating system, the storage operating system when executed operable to: access a data block of the clone volume; and determine that the data block is a correctly accessed data block if a volume ID of the data block matches at least one of the first and second unique bufftree IDs of either the clone volume or the parent volume and if a write time of the data block is prior to creation of the clone volume.

19. The storage system as in claim 18, further comprising:

a centralized database operatively connected to the storage system configured to store a physical location of the data block; and wherein the storage operating system when executed is further operable to: query the centralized database to determine a correct physical storage location of the data block in response to a determination that the data block is an incorrectly accessed data block.

20. The storage system as in claim 19, wherein the storage operating system when executed is further operable to:

determine that the data block is lost in response to the determination that the centralized database matches the physical storage location of the incorrectly accessed data block; and access the data block at a new physical storage location in response to a determination that the centralized database contains the new physical storage location of the data block.

21. The storage system as in claim 18, wherein the bufftree ID comprises the volume ID of which volume stores the data block.

* * * * *

UNITED STATES PATENT AND TRADEMARK OFFICE
CERTIFICATE OF CORRECTION

Page 1 of 2

PATENT NO. : 7,996,636 B1
APPLICATION NO. : 11/935704
DATED : August 9, 2011
INVENTOR(S) : Prakash et al.

It is certified that error appears in the above-identified patent and that said Letters Patent is hereby corrected as shown below:

In Col. 6, line 60, should read:
cuitry that couples to the disks over an ~~I/0~~ I/O interconnect In Col. 11, line 46, should read:
(e.g., ~~Mode~~ inode or indirect block). On a read path of a logical In Col. 11, lines 49-50, should read:
which, in turn, points to an ~~Mode~~ inode file and its corresponding ~~Mode~~ inode buffer tree. The read path on a flexible volume is In Col. 11, line 63, should read:
e.g., level 1 (L1) indirect blocks, ~~Mode~~ inode file level 0 (L0)

In Col. 11, line 67, should read:
~~Mode~~ inode 502, such as an embedded ~~Mode~~inode, references indirect In Col. 12, line 4, should read:
the size of the file. The indirect blocks (and ~~Mode~~inode) contain In Col. 14, line 22, should read:
write ~~I/0~~ I/O operations. It should be noted that "snapshot" is a In Col. 14, line 35, should read:
always an active file ~~sys-tem~~ system image that contains complete In Col. 14, line 39, should read:
the image is taken. The terms "PCPI" and "~~snap-shot~~snapshot" may be Signed and Sealed this
Twentieth Day of March, 2012

David J. Kappos
*Director of the United States Patent and Trademark Office*

CERTIFICATE OF CORRECTION (continued)
U.S. Pat. No. 7,996,636 B1

In Col. 26, line 45, should read:
  accessing a ~~con-tamer~~ container file for a reference to the relocated data